United States Patent
Terrel et al.

(10) Patent No.: US 7,404,693 B2
(45) Date of Patent: Jul. 29, 2008

(54) METHOD AND SYSTEM FOR A CONTAINMENT SYSTEM, SUCH AS A SEAMLESS CONTAINMENT CAP FOR SOLID WASTE CONSTRUCTED OF POLYMER-MODIFIED ASPHALT

(75) Inventors: Ronald L. Terrel, Edmonds, WA (US); Karl Yost, Anacortes, WA (US); Gale Schwiesow, Bellingham, WA (US)

(73) Assignee: Wilder Construction Company, Everett, WA (US)

( * ) Notice: Subject to any disclaimer, the term of this patent is extended or adjusted under 35 U.S.C. 154(b) by 0 days.

(21) Appl. No.: 11/480,312

(22) Filed: Jun. 29, 2006

(65) Prior Publication Data

US 2007/0014635 A1    Jan. 18, 2007

Related U.S. Application Data

(63) Continuation of application No. 11/040,828, filed on Jan. 20, 2005, now Pat. No. 7,077,602, which is a continuation-in-part of application No. 10/763,806, filed on Jan. 22, 2004, now abandoned, which is a continuation-in-part of application No. 10/438,173, filed on May 12, 2003, now abandoned.

(60) Provisional application No. 60/379,959, filed on May 10, 2002.

(51) Int. Cl.
B09B 1/00    (2006.01)

(52) U.S. Cl. .................... 405/129.45; 404/31

(58) Field of Classification Search ............ 405/129.45, 405/129.6, 129.75; 404/31, 39, 41
See application file for complete search history.

(56) References Cited

U.S. PATENT DOCUMENTS

| 3,586,624 A | 6/1971 | Larson |
| 4,526,615 A | 7/1985 | Johnson |
| 5,078,543 A | 1/1992 | Terrel |
| 5,365,793 A | 11/1994 | Terrel et al. |

(Continued)

FOREIGN PATENT DOCUMENTS

EP    0420747    4/1991

(Continued)

OTHER PUBLICATIONS

John J. Bowders, et al. Asphalt Barriers for Waste Isolation, GeoEng2000, Melbourne Australia, Nov. 19-24, 2000.*

(Continued)

*Primary Examiner*—John Kreck
(74) *Attorney, Agent, or Firm*—Perkins Coie LLP

(57) ABSTRACT

The present invention is directed to a waste or environmental containment system that includes modified asphalt specifically designed for containment, and a system of installation that provides a seamless cap over the area to be contained. The modified asphalt of the present invention has a permeability less than $1\times10^{-8}$ cm/sec and an air void content less than 3 percent. The system of installation includes joint designs that meet the same parameters as the modified asphalt mat to provide a seamless containment cap or liner to contain hazardous wastes at RCRA, Superfund sites, waste sites and environmental containment areas.

1 Claim, 15 Drawing Sheets

U.S. PATENT DOCUMENTS

| | | |
|---|---|---|
| 6,113,681 A | 9/2000 | Tripathi et al. |
| 6,270,284 B1 * | 8/2001 | Sovik .......................... 404/47 |
| 7,077,602 B2 | 7/2006 | Terrel et al. |

FOREIGN PATENT DOCUMENTS

| | | |
|---|---|---|
| FR | 2495664 | 6/1982 |
| FR | 2625243 | 6/1989 |
| GB | 1035879 | 7/1966 |
| JP | 2002061148 A * | 2/2002 |

OTHER PUBLICATIONS

Bowders et al., Asphalt-based Lining System for Landfills, Missouri Waste Control Coalition Conference, 2001 A Waste Odyssey, Jul. 7-9, 2001, Columbia Missouri.*

Von Erich Schonian, Asphaltbeton-Dichtungen im Deponiebau, Jan. 23, 1991, pp. 12, and 14-19, Berlin.

Wilder Construction Company, "MatCon Modified Asphalt Technology for Waste Containment," EPA Site [Superfund Innovative Technology Evaluation] Demonstration Bulletin, Jan. 2001.

Unknown, "MatCon Modified Asphalt for Waste Containment," EPA Site [Superfund Innovative Technology Evaluation] Technology Capsule, Mar. 2001.

* cited by examiner

EXEMPLARY BINDER PROPERTIES

| ORIGINAL BINDER: | TEST METHOD | PROJECT A | PROJECT B |
|---|---|---|---|
| FLASH POINT, °C | AASHTO T48 | 308.6 | 340 |
| VISCOSITY, cps@135°C | ASTM D4402 | | |
| @175°C | | 920 | 1,830 |
| @200°C | | 197 | 374 |
| DYNAMIC SHEAR@82°C, kPa (G*/sinδ, 10 rad./sec.) | AASHTO TP5 | 1,412 | 1,290 |
| COMPATIBILITY (163°C/48 hrs) | ASTM D5892 | 99 | |
| SP top 1/3 | ASTM | 172.3 | 156.3 |
| SP bottom 1/3 | | 172.8 | 158.0 |

| AFTER RTFOT: | | | |
|---|---|---|---|
| MASS LOSS, % | AASHTO T240 | 0.542 | 0.114 |
| DYNAMIC SHEAR@82°C, kPa (G*/sinδ, 10 rad./sec.) | AASHTO TP5 | 2.125 | 2.392 |

| PAV RESIDUE (100°C, 300psi, 20 hrs) | AASHTO PP1 | | |
|---|---|---|---|
| DYNAMIC SHEAR@34°C, kPa (G*/sinδ, 10 rad./sec.) | AASHTO TP5 | 1,217 | 337 |
| CREEP STIFFNESS@-12°C, STIFFNESS, MPa (60 sec) | AASHTO TP1 | 254.0 | 104 |
| M VALUE | | 0.312 | 0.322 |
| DIRECT TENSION, @-12°C, % STRAIN | AASHTO TP3 | 0.853 | 1.786 |

FIG. 5

BINDER PREPARATION INFORMATION:

FORMULA:

| Material | Percentage, % |
|---|---|
| Paramount AC-5 Asphalt | 57.0 |
| Paramount EBS Asphalt | 37.0 |
| Modifier A (ESI) | 4.0 |
| Modifier B (WAX) | 0.5 |
| Modifier C (SBS) | 1.5 |
| Total | 100.0 |

BLENDING PROPERTIES:

| Temperature: | 365-390°F |
|---|---|
| Blending/Mixing Type | high shear followed by paddle agitation |
| Mix Time | 2-3 hrs |
| Storage/Delivery Temperature | 365-385°F Target: 360°F |
| Order of Addition: 1st | blend/mix asphalt |
| Order of Addition: 2nd | Modifier |
| Order of Addition: 3rd | Modifiers A & B in ratio of 3 parts Modifier B to 1 Part Modifier A per formula above |

*FIG. 6*

Aggregate Gradation:

| SIEVE SIZE, mm (No.) | DENSE-GRADED Wt % Passing | DENSE-GRADED Spec Range, % passing | OPEN-GRADED Spec Range, % passing |
|---|---|---|---|
| 19.0 (3/4") | 100.0 | 100.0 | 70-100 |
| 12.5 (1/2") | 100.0 | 100.0 | 25-40 |
| 9.5 (3/8") | 97.9 | 85-100 | 5-15 |
| 4.75 (No. 4) | 69.7 | 60-80 | 0-2 |
| 2.36 (No. 8) | 42.8 | 40-60 | 0-1 |
| 1.18 (No. 16) | 26.4 | 25-40 | 0-1 |
| 0.600 (No. 30) | 19.0 | 15-25 | 0-1 |
| 0.300 (No. 50) | 14.4 | 11-20 | 0-1 |
| 0.150 (No. 100) | 10.6 | 7-15 | 0-1 |
| 0.075 (No. 200) | 7.5 | 5-10 | 0-1 |

% PASSING BASED ON TOTAL WEIGHT OF AGGREGATE

*FIG. 7*

- ▫ MODIFIED ASPHALT
- ▫ SAND BED
- ▨ WOOD BLOCK

Exemplary Embodiment

Binder Design / Temperature °C

| Project | % Binder @ 3% Voids (of Total Mix) | Binder (% of Total Mix) | Polymer (% of Binder) | Wax (% of Binder) | Mix Minimum | Mix Maximum | Compact Minimum | Compact Maximum |
|---|---|---|---|---|---|---|---|---|
| Range: | 5.5 - 7.0 | 6.5 - 7.5 | 3.5 - 7.0 | up to 2.0 | 165 | 220 | 155 | 210 |
| Projects |  |  |  |  |  |  |  |  |
| A | 5.8% | 6.9% | 4.0% |  | 178 |  | 174 |  |
| B |  | 7.0% | 5.0% |  | 180 |  | 165 |  |
| C | 6.5% | 7.0% | 5.2% | 1.8% | 175 | 183 | 163 | 169 |
| D | 6.8% | 7.0% | 6.5% | 1.8% | 171 | 177 | 160 | 168 |
| E | 6.3% | 7.0% | 5.0% | 0.5% | 202 | 206 | 190 | 195 |
| F | 6.6% | 7.0% |  |  | 186 | 193 | 175 | 180 |
| G | 6.5% | 7.0% |  |  | 183 | 188 | 172 | 176 |
| H |  |  |  |  |  |  |  |  |
| Statistics |  |  |  |  |  |  |  |  |
| minimum | 5.8% | 6.9% | 4.0% | 0.5% | 171 | 177 | 160 | 168 |
| maximum | 6.8% | 7.0% | 6.5% | 1.8% | 202 | 206 | 190 | 195 |
| average | 6.4% | 7.0% | 5.1% | 1.4% | 182 | 189 | 171 | 178 |

Aggregate Gradations — Target Weight Passing

| Sieve Size, No. | Guideline Range Minimum | Guideline Range Maximum | Site A | Site B | Site C | Site D | Site E | Site F | Site G | Site H | Min | Max | Average |
|---|---|---|---|---|---|---|---|---|---|---|---|---|---|
| 1/2" | 99 | 100 | 99.8% | 100.0% | 100.0% | 100.0% | 100.0% | 100.0% | 100.0% | 100.0% | 99.8% | 100.0% | 100.0% |
| 3/8" | 85 | 100 | 94.0% | 97.9% | 97.7% | 99.7% | 98.0% | 99.3% | 97.0% | 94.0% | 94.0% | 99.7% | 97.2% |
| 4 | 60 | 80 | 60.7% | 69.7% | 64.2% | 73.8% | 77.0% | 68.0% | 73.0% | 67.0% | 60.7% | 77.0% | 69.2% |
| 8 | 40 | 60 | 51.4% | 42.8% | 40.3% | 46.7% | 51.0% | 46.1% | 52.0% | 53.0% | 40.3% | 53.0% | 47.9% |
| 16 | 25 | 40 | 37.7% | 26.4% | 26.4% | 32.6% | 33.0% | 32.9% | 34.0% | 40.0% | 26.4% | 40.0% | 32.9% |
| 30 | 15 | 25 | 26.1% | 19.0% | 18.2% | 24.0% | 23.0% | 24.6% | 21.0% | 25.0% | 18.2% | 26.1% | 22.6% |
| 50 | 11 | 20 | 15.2% | 14.4% | 14.5% | 17.7% | 15.0% | 18.4% | 13.0% | 15.0% | 13.0% | 18.4% | 15.4% |
| 100 | 7 | 15 | 10.0% | 10.6% | 10.6% | 11.4% | 11.0% | 12.9% | 8.0% | 9.0% | 8.0% | 12.9% | 10.4% |
| 200 | 5 | 10 | 7.6% | 7.5% | 6.8% | 6.2% | 9.0% | 9.1% | 6.0% | 7.0% | 6.0% | 9.1% | 7.4% |

Notes:
1. 3/4" - 1" aggregate may be used for sites that will receive heavy loading and wearing, e.g.; log yards, port facilities, metal scrap yards and intermodal facilities
2. Thickness: nominal 4" preferred 3.5" - 4.5", thicker for sites with heavy loading or wear.

*FIG. 11*

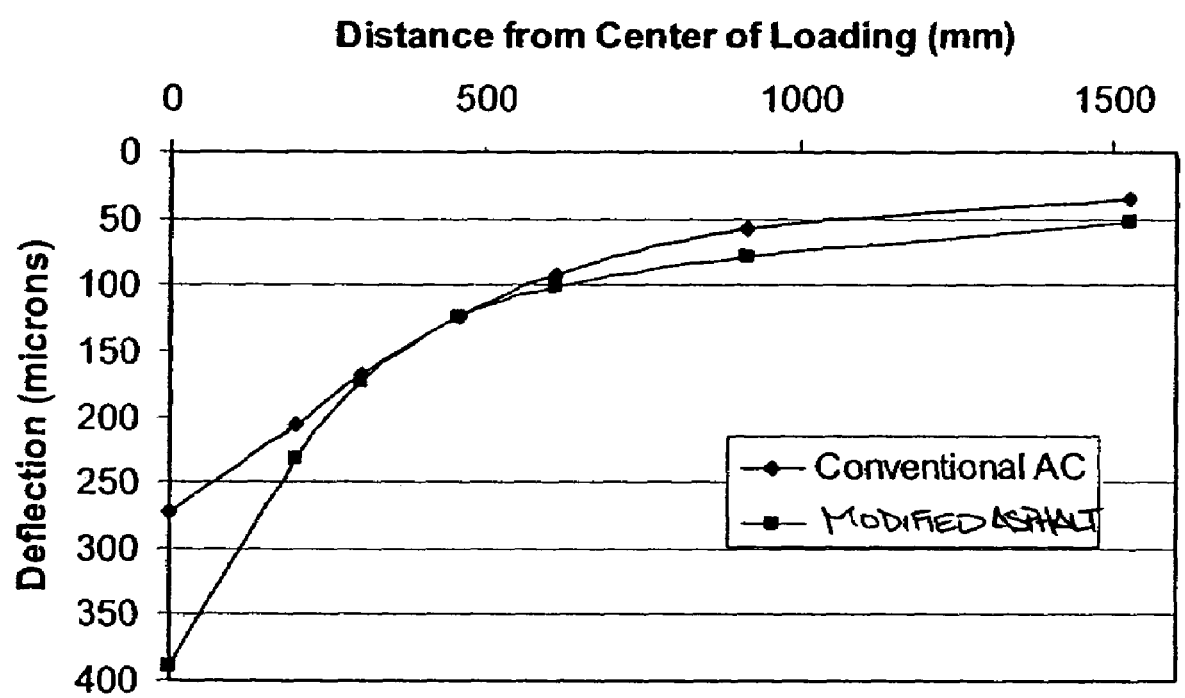
Figure 12: Typical deflection

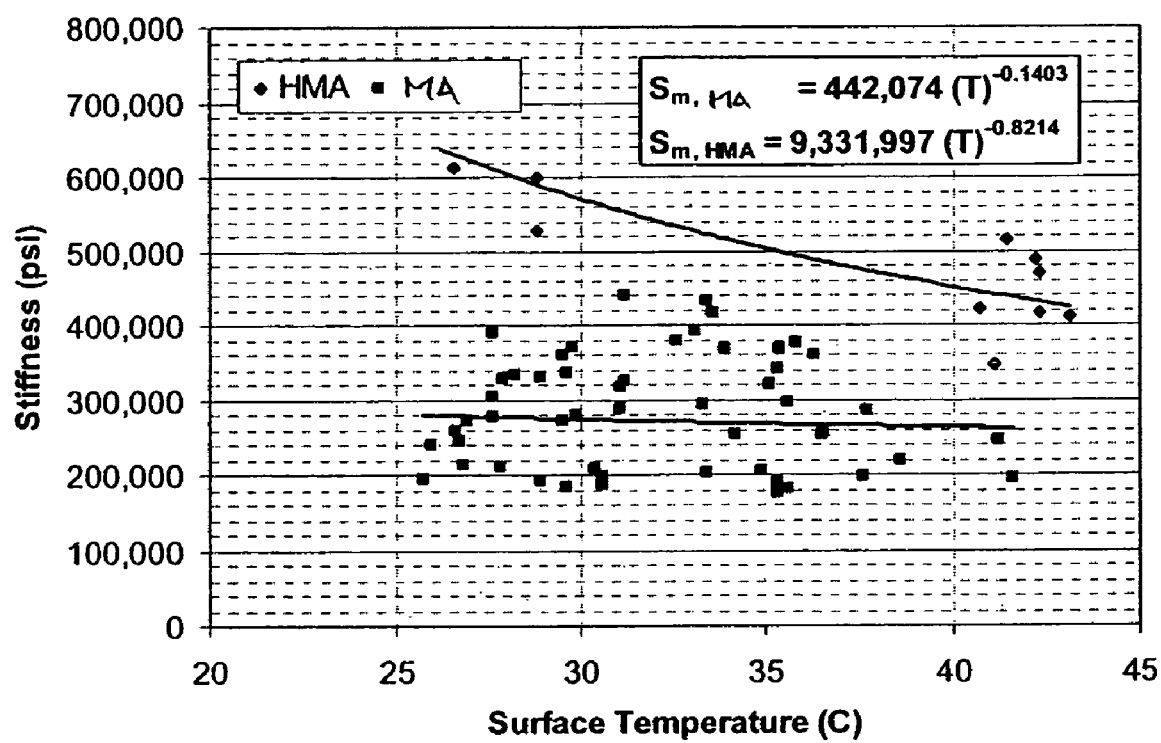
Figure 13 Surface temperature versus stiffness

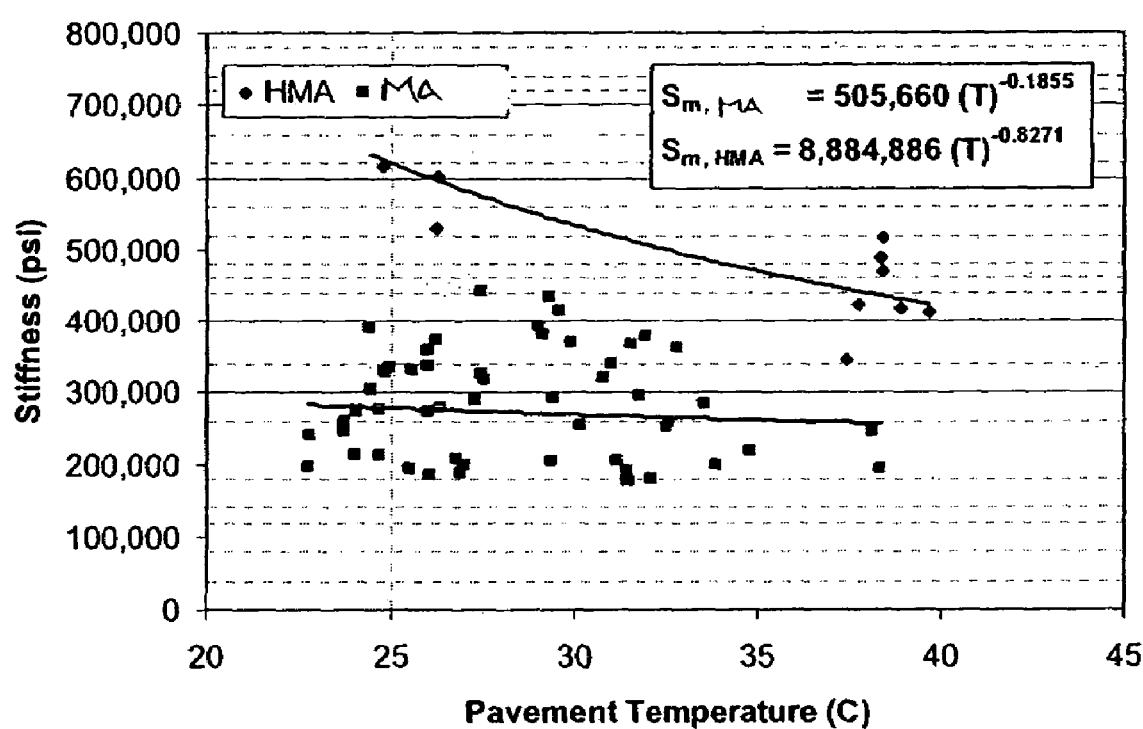
Figure 14: Pavement temperature versus stiffness

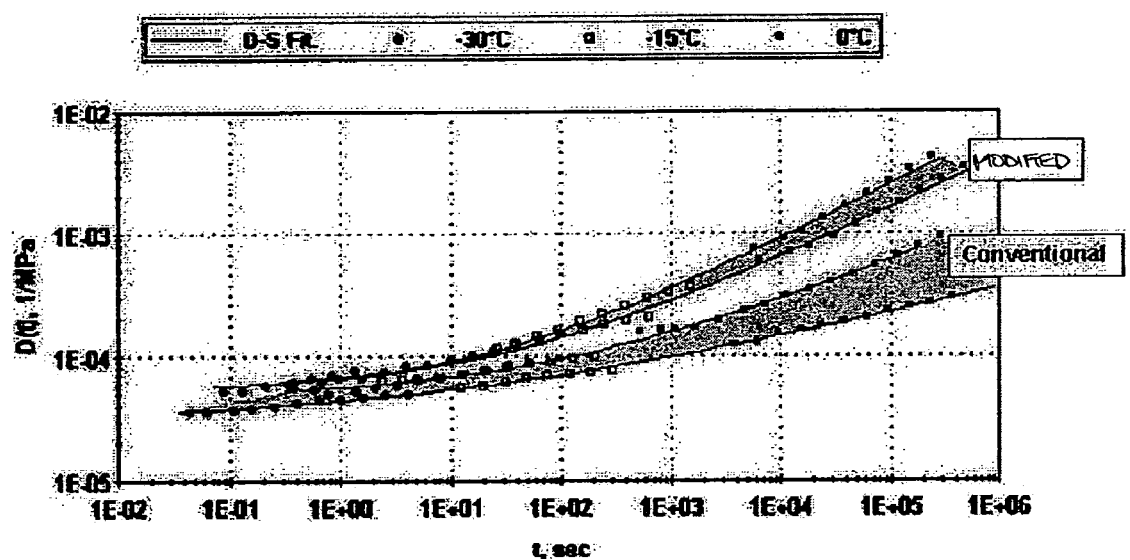
Figure 15: D(t) Mastercurves for conventional HMA and Modified ($T_{ref}$ = -18.1°C/-0.6°F)
(test temperatures of the individual shifted isotherms are identified by different symbols)

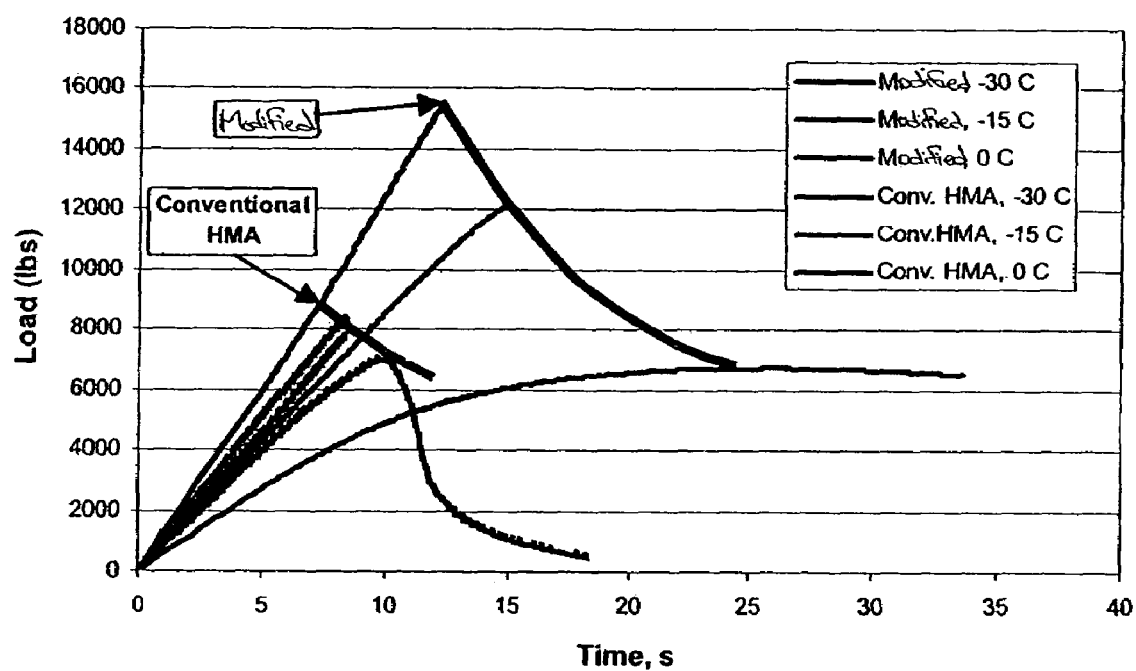
Figure 16: Tensile load versus time

METHOD AND SYSTEM FOR A CONTAINMENT SYSTEM, SUCH AS A SEAMLESS CONTAINMENT CAP FOR SOLID WASTE CONSTRUCTED OF POLYMER-MODIFIED ASPHALT

CROSS-REFERENCE TO RELATED APPLICATION

This application is a continuation of U.S. patent application Ser. No. 11/040,828, filed Jan. 20, 2005, which is a continuation-in-part of 10/763,806, filed Jan. 22, 2004; which is a continuation-in-part of 10/438,173, filed May 12, 2003; which claims priority to U.S. Provisional Patent Application No. 60/379,959, filed May 10, 2002, which are all incorporated herein by reference.

BACKGROUND OF THE INVENTION

1. Field of the Invention

This invention relates to a method and system for waste containment and environmental applications, and more particularly, to a cap or liner system constructed of a modified asphalt mixture for use in a waste and environmental containment system.

2. Description of the Related Art

When municipal solid waste and waste and hazardous waste landfills reach their capacities, the waste sites are capped with a final cover that keeps out rainfall and prevents leachate generation and possible environmental contamination. These final covers have traditionally been constructed of layers of clay, sand, vegetated topsoil and, sometimes, geosynthetic materials Additional sites that require cover include brownfields, spills and industrial sites.

The U.S. Environmental Protection Agency (EPA) has strict regulations for these waste containment and environmental cleanup sites. The EPA has developed a standard of containment that not only includes installations requirements, but also maintenance, monitoring and longevity. Further considerations of the waste site include the cost of installing and maintaining a system, future ability to reuse the site and ongoing inspection considerations.

Most landfill covers in the U.S. are required to meet the minimum regulatory performance standards set forth under the EPA'S Resource Conservation and Recovery Act (RCRA) in subtitles D for municipal landfills (soil cover) and C for hazardous waste landfills (compacted clay cover). Although subtitles D and C do not detail specific cover designs, the regulations allow the governing regulatory agency to consider and approve an alternative final cover as long as it meets the performance standards.

However, most landfills in the U.S. do implement the soil covers and compacted clay cover designs of subtitles D and C, often with little regard for regional conditions. These designs are used even though the EPA has found that a barrier layer composed of clay and a geomembrane under subtitle C is "not very effective" in arid regions. The reason clay barriers were not recommended was because the soil is compacted with more moisture than is needed to achieve optimum density. As the soil dries, it experiences a high level of volume reduction, which leads to cracking caused by shrinkage. The EPA guidelines state: "this traditional cover not only is inherently problematic, but is also very expensive and difficult to construct. Furthermore, the basic soil cover used with Subtitle D also has its problems, as the barrier layer is subject to deterioration due to freeze/thaw cycles."

Current cover containment practice centers around the use of composite barriers comprised of geomembranes, geosynthetic clay liners (GCL), compacted clay, or amended site soils. Most conventional containment systems are multi-layer geosynthetic or membrane type systems. Installations of these systems are costly due to the multi-layer design. Typically the layers added 2 to 9 feet or more of a cap onto the existing waste or environmental site. These systems were historically subject to damage during construction from equipment, and thereafter from vegetation roots and small animals. Further limitations of the multi-layer membrane systems included difficulty visually inspecting the buried membrane. Rupture of the membrane during installation or thereafter would render the system useless for its intended purpose. Not only was detection of a leak difficult, but repair required excavation of the various layers and risked further damage upon re-exposing the membrane layers. Often due to the nature of the membranes, the site was no longer available for future use as a storage facility or other use due to restrictions on loading.

Other construction materials were historically not sufficiently impermeable or resilient to be used in place of the geosynthetic or membrane. For example, conventional asphalt pavement has a permeability coefficient in the range of $1 \times 10^{-5}$ cm/sec with 6-8% air voids. Further, conventional asphalt is typically sensitive to temperature changes. Temperature/Viscosity curves illustrate that conventional asphalt is a liquid at 300° F. when it is mixed, but at very low temperatures can be as brittle as glass.

A 1988 study by the EPA of randomly selected landfills revealed that the vast majority are leaking, and many have caused severe contamination of the groundwater and surrounding ecosystems.

Thus, a waste containment system that meets or exceeds EPA containment requirements, including permeability, longevity, and resilience; allows rapid installation; is easy to maintain; cost effective and provides additional uses for the site once containment is complete, is needed.

BRIEF SUMMARY OF THE INVENTION

The present invention is directed to a waste or environmental containment system that includes modified asphalt specifically designed for long-term containment, and a system of installation that provides a seamless cap over the area to be contained. Under aspects of the invention, the specifically designed modified asphalt has a permeability coefficient less than $1 \times 10^{-7}$ cm/sec and an air void content less than 3 percent. Under another aspect of the invention, cold and hot joint designs provide a seamless containment cap.

The present invention advantageously provides a system of containment that is cost-effective, meets stringent EPA standards, is resistant to erosion, remains stable on slopes and conforms to settlement, is resilient over a wide range of temperature variations and is not subject to damage under UV light exposure, offers longevity, ease of maintenance and inspection, provides a thinner cross-section requiring less material import and more storage space, rapid installation with conventional construction equipment, and allows reuse of the site for a variety of potential alternative uses: parking, equipment storage, truck/train intermodal facilities, multi-use sports facilities, and the like.

BRIEF DESCRIPTION OF THE SEVERAL VIEWS OF THE DRAWING(S)

FIG. 5 is a chart of exemplary binder properties according to the principles of the present invention.

FIG. 6 is a chart of exemplary binder formula and blending parameters according to principles of the present invention.

FIG. 7 is a chart of an exemplary aggregate gradation for dense-graded and open-graded modified asphalt according to principles of the present invention.

Figure 9A:
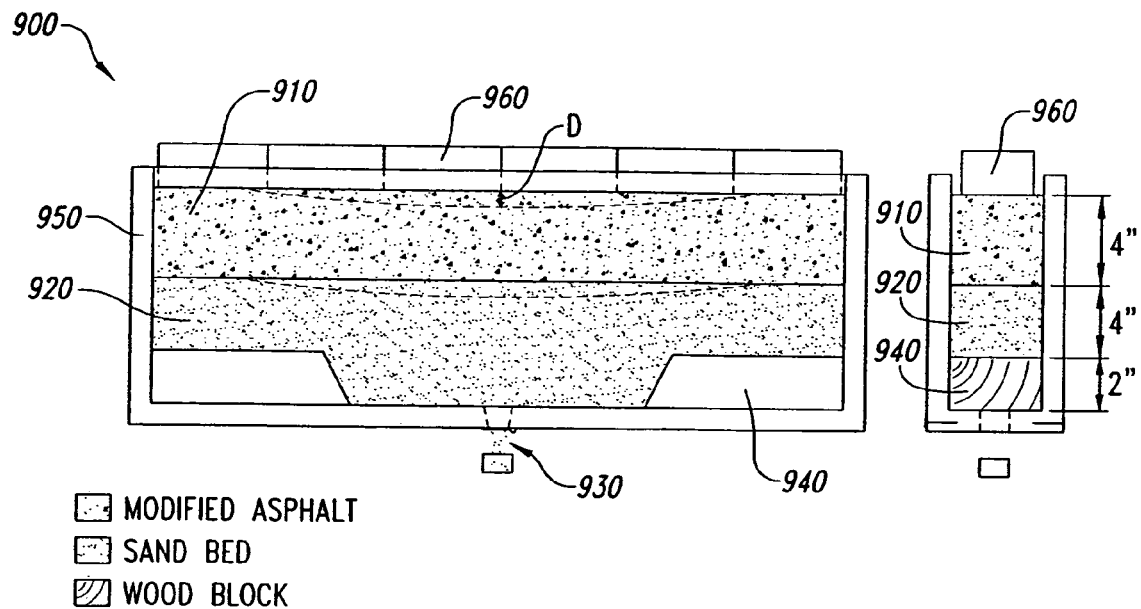
Figure 9B:
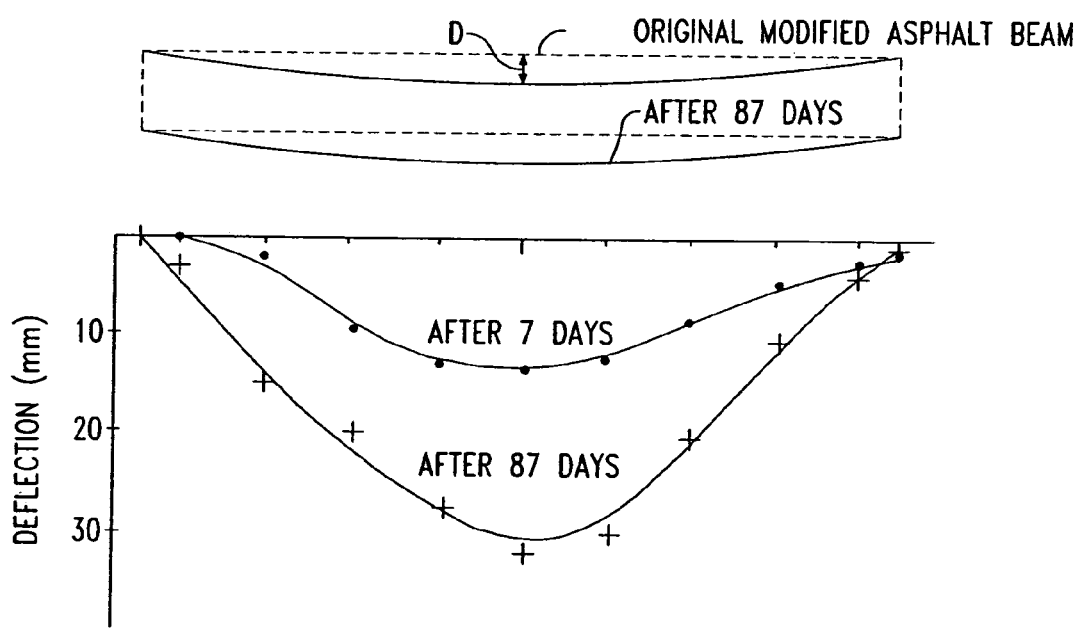
Figure 9C:
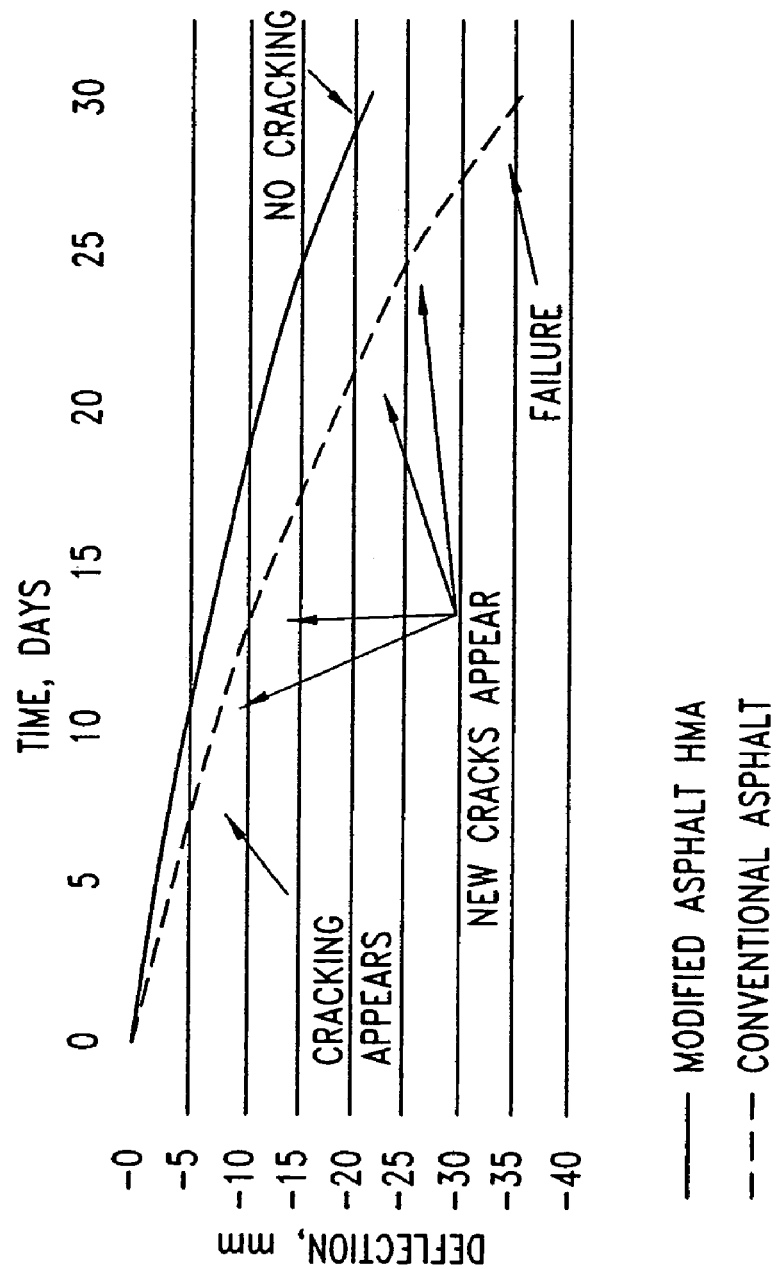

FIGS. 9A-9C includes a cross section of a deflection test and the associated graphs of flexural tests and deflection curves according to principles of the present invention.

Figure 10:
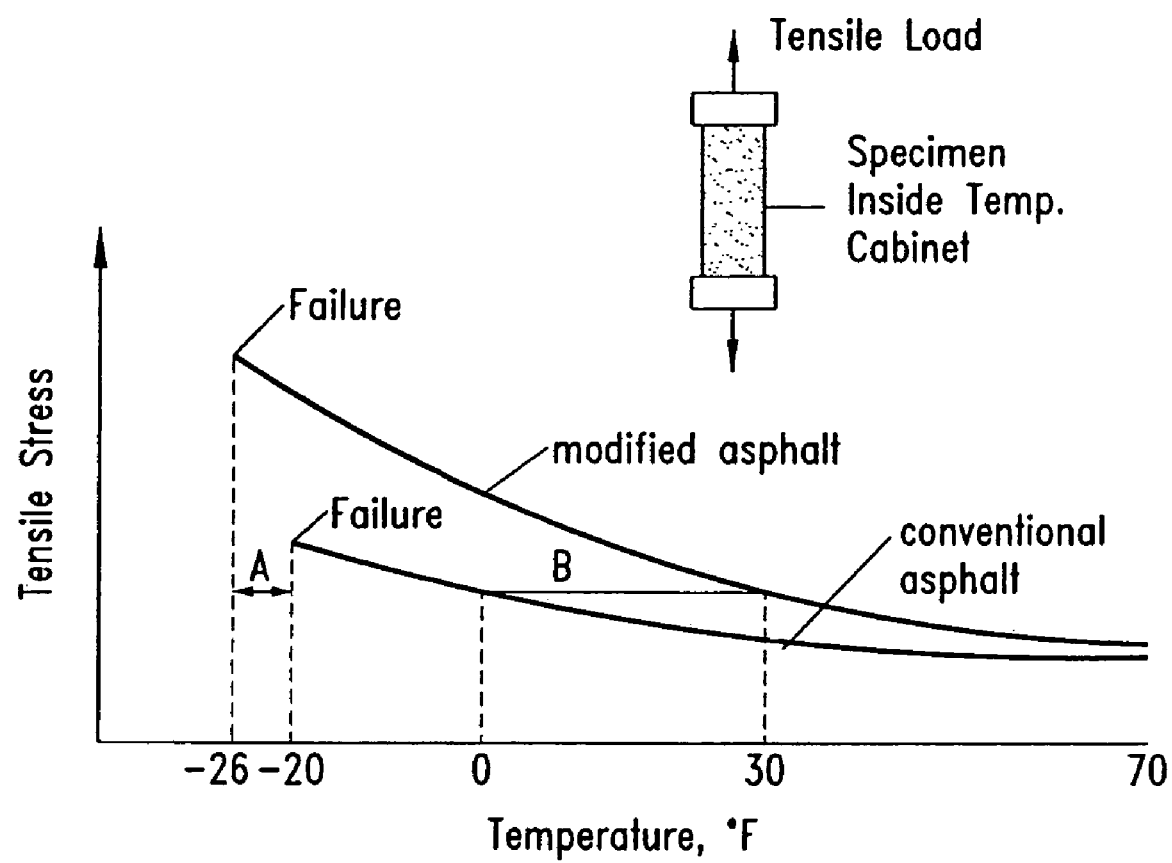

FIG. 10 is a graph of Temperature versus Tensile Strength illustrating the relative resistance to thermal cracking of the modified asphalt of the present invention as compared to conventional asphalt according to principles of the present invention.

FIG. 11 is a chart illustrating project specific material ranges and an exemplary range for the modified asphalt mix of the present invention according to principles of the present invention.

FIG. 12 is a chart of the deflection depth against a distance from the center of loading for both conventional asphalt and for the modified asphalt according to principles of the present invention.

FIG. 13 illustrates the surface temperature versus stiffness for both conventional asphalt and for the modified asphalt of the present invention according to principles of the present invention.

FIG. 14 illustrates the pavement temperature versus stiffness for both conventional asphalt and for the modified asphalt of the present invention according to principles of the present invention.

FIG. 15 illustrates mastercurves for conventional asphalt and modified asphalt according to principles of the present invention.

FIG. 16 illustrates the tensile load versus time for conventional asphalt and modified asphalt at various temperatures according to principles of the present invention.

DETAILED DESCRIPTION OF THE INVENTION

The present invention is directed to a waste or environmental containment system to contain hazardous wastes at RCRA and Superfund sites, landfills, brownfields, spills and industrial sites. The system includes modified asphalt specifically designed for containment, and a system of installation that provides a seamless cap over the area to be contained. The modified asphalt contains high quality, specifically sized mineral aggregate and a highly modified binder using additives beneficial to environmental applications. Under aspects of the invention, the specifically designed modified asphalt mixture has a permeability coefficient less than $1 \times 10^{-7}$ cm/sec and an air void content less than 3 percent. Under another aspect of the invention, cold and hot joint designs provide a seamless containment cap.

The modified asphalt of the present invention has met EPA guidelines for use in waste containment applications. The permeabilities, flexural properties, load capacity, tensile strength, thermal crack resistance, fuel resistance and aging and weathering resistance that are detailed below combine to provide a material that when installed according to aspects of the present invention, yields a seamless containment system.

As illustrated in the plan view of FIG. 1, a waste site 100 receives the seamless cap or containment liner upon a prepared subgrade 120 as detailed further below. The modified asphalt 110 is laid over the subgrade or other substrate 120. Cold joints, perimeter joints and free edges that tie asphalt mixtures to membranes 130 are further illustrated in FIGS. 2, 3 and 4. The cold joint can be pre-formed of hot mix on the last pass of the project, for example, at the end of the workday. Alternatively, the entire cold joint may be milled from the previous stopping point 210.

Figure 1:
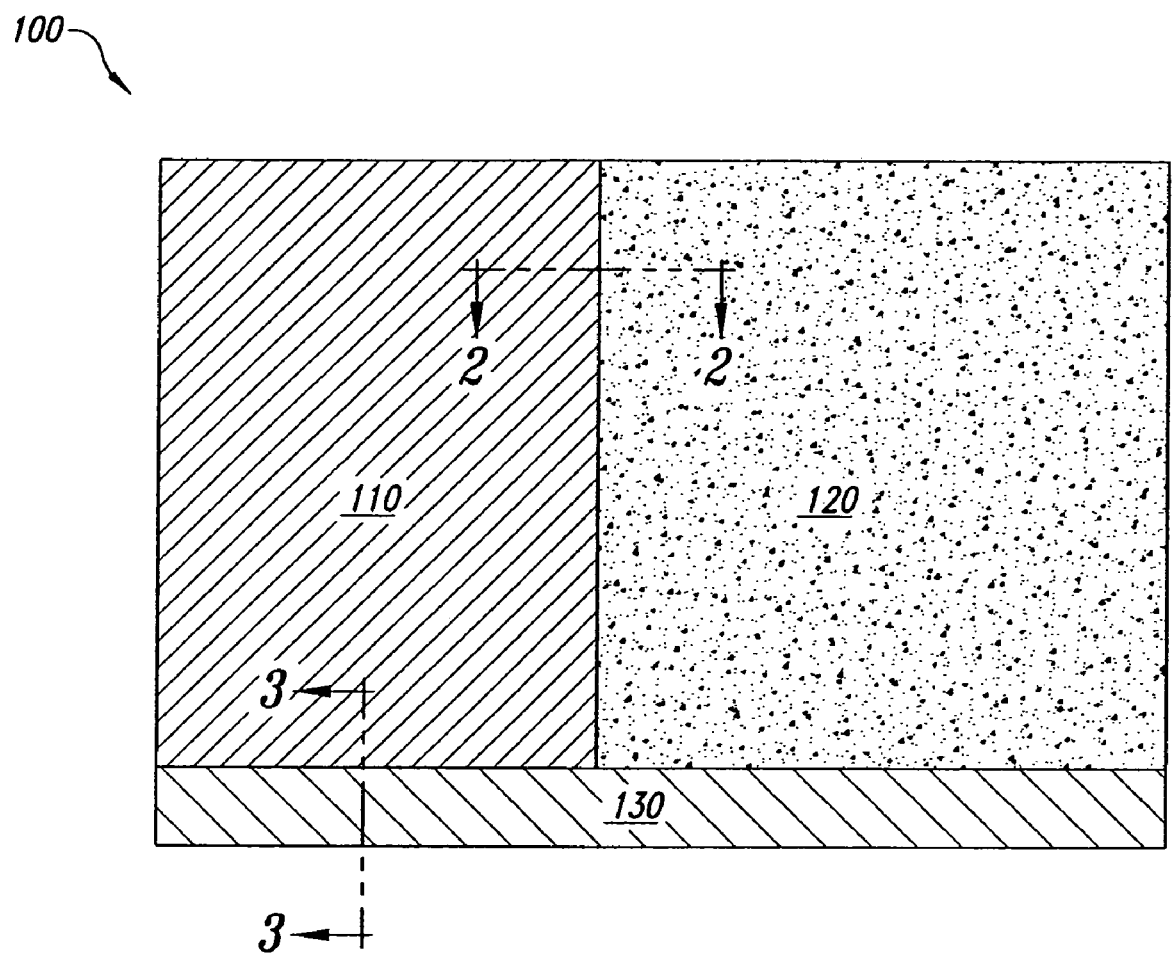
FIG. 1 illustrates a plan view of a waste containment site partially covered with the seamless cap according to principles of the present invention.
Figure 2:
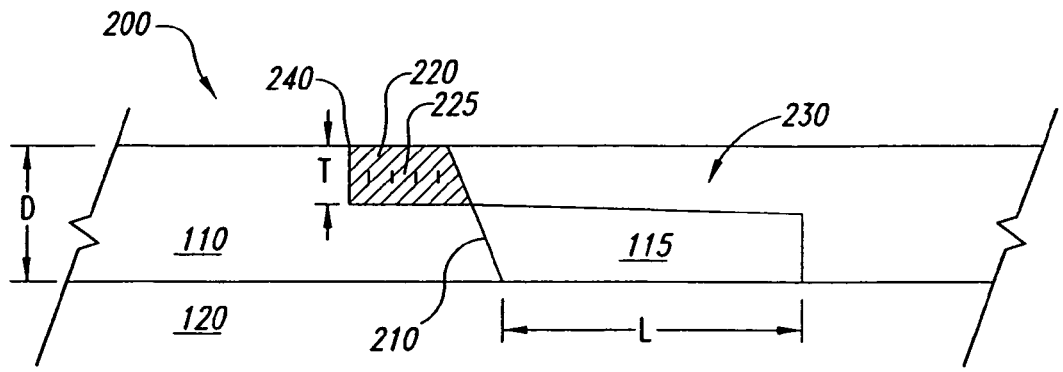
FIG. 2 is a cross sectional view along line 2-2 of FIG. 1 of a cold joint of the seamless cap according to principles of the present invention.

FIG. 2 illustrates a cross-section of FIG. 1 along line 2-2. The cap section 200 represents a cold joint 210 or stopping point for various construction reasons. The joint 210 must be tied into in order to provide a seamless impervious cap or liner. A cold joint panel 115 of approximate length L of 10' is placed against the cold panel 110. Conventional asphalt tacking methods are used along the joint. A milled area 220 is removed from the cold panel 110 to a depth of adjacent joint cold panel 115. In the exemplary example, the thickness T of the milling is approximately 1.5 in., and the depth D of the asphalt is approximately 4".

The milled surface 225 is broomed clean and the surface of all cleaned cold panels are heavily tacked with modified asphalt. A final hot panel 230 is paved and compacted against the milled edge 225. The surface seam 240 is further sealed with modified asphalt.

Figure 3:
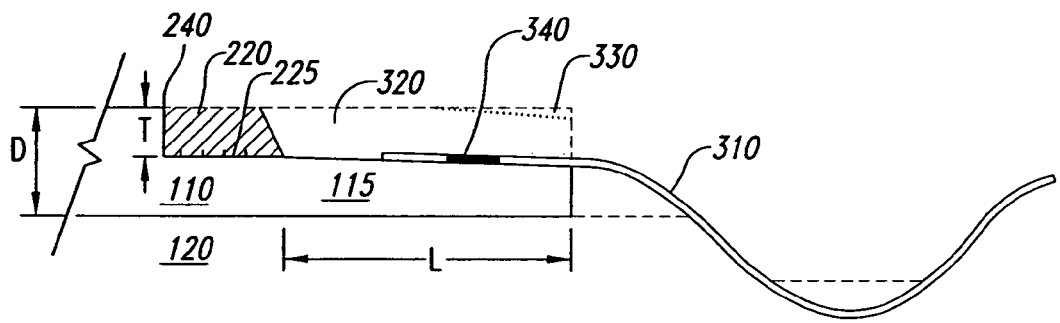
FIG. 3 is a cross sectional view along line 3-3 of FIG. 1 of a cold joint tie-in for membrane material according to principles of the present invention.

FIG. 3 illustrates a cross-section of an optional edge detail along line 3-3 of FIG. 1. The joint illustrated in FIG. 3 allows for the modified asphalt system to be tied into a membrane. The joint is prepared similarly to the cold joint of FIG. 2, however, after the milled section 220 is removed, a membrane 310 is placed on the cold panel 115 prior to placement of the final hot panel 320. The hot panel 320 may be optionally sloped 330 to provide drainage.

The membrane 310 further includes openings or windows 340 cut therein. The windows 310 may include various shapes as illustrated in the top view of the membrane opening shown in FIG. 4. The openings 340 may be round 342, square 344 or any other geometric shape to allow ample contact between cold and hot panels. The windows allow bonding of the cold and hot panels by applying a tack coat to the exposed cold panel 115 through the open windows.

The combination of cold joints, hot joints (described below) and the interface between membrane and asphalt provides a continuous, seamless mat of modified asphalt concrete mixture capable of providing a cap or liner sufficiently impervious to be used for hazardous waste confinement. Further aspects of the modified asphalt and installation process is described below.

I. Modified Asphalt

Various studies have examined the leachability of semi-volatile organics and heavy metals from the modified asphalt of the present invention in the presence of various extraction fluids. The results support the conclusion that the modified asphalt of the present invention will leach fewer constituents than traditional asphalt concrete pavement.

First, the modified asphalt is formulated, blended in asphalt plants, and installed at temperature ranges above those common to traditional asphalt cement. At these temperatures, the limited amount of lower molecular weight (leachable) organic compounds in asphalt cement are more rapidly volatilized, and the spectrum of heavier molecular weight organic compounds subject to volatilization is expanded. As a result, the modified asphalt materials produced in an asphalt hot mixing plant will contain even fewer volatile organic compounds than traditional asphalt cement and placed asphalt concrete.

Second, the modified asphalt is manufactured using traditional high quality asphalt cement by blending with modifiers that have a molecular weight in excess of 80× asphalt cement molecules. Blending at elevated temperatures that decrease viscosity in high shear mixing conditions initiates the physical and chemical reactions between the modifier molecules and the asphalt cement molecules yielding longer-chained and heavier molecules than traditional asphalt concrete molecules at ambient temperatures. Both physical binding mechanisms and chemical bonding kinetics create a more stable end product with higher intermolecular stability, a higher melting point, an enhanced dielectric constant, and decreased molecular chain-branching. Consistent with organic chemistry principles increases in molecular weight and complexity of geometric molecular structure increases the matrix's ability to retain its constituents, decreases reactivity and solubility, increases viscosity, and, therefore, decreases the amount of potentially leachable constituents. In combination, the heat of manufacture and the inclusion of the densification modifier, the ability of the modified asphalt to retain its constituent molecular components are greatly enhanced over traditional asphalt concrete.

Third, the modified asphalt modifiers do not contain heavy metals or other hazardous material constituents. Further, the physical binding and chemical bonding characteristics provided by the supplemental modifiers enhances the ability of the host the modified asphalt end product matrix to retain such components if present in the conventional asphalt cement and, more importantly, aggregates added in the mix.

Fourth, the decreased permeability of the modified asphalt ($<1 \times 10^{-8}$ cm/sec) will prevent the intrusion and pass-through of potential carrier fluids. Without the ability of a fluid to pass through the modified asphalt matrix, only surfaces of the matrix will be subjected to leachable conditions.

Analytical testing performed on the modified asphalt mixture samples examined leachability of various analytes to various aqueous extraction fluids including deonized water, solid waste landfill leachate, and methyl ethyl ketone. Results from that testing indicate that USEPA SW-846, Method 8270 organics, and the RCRA metals did not leach from the modified asphalt mixture specimens after being rigorously agitated for 96 hours. Since neither high quality asphalt cement nor the modified asphalt modifiers contain heavy metals, the data does show that trace levels of arsenic and barium found in the landfill leachate extraction of the modified asphalt were sourced from either the leachate itself, the native aggregate used in the modified asphalt, or both, and not the modified asphalt modifier or asphalt cement.

The actual modifier dosage added to asphalt cement, when compared to the actual mass of the final modified asphalt hot mix (asphalt cement+modifier+aggregate), is of insignificant concentration to be quantified in any analytical method extract. More importantly, the modifier, when fully blended and reacted in the asphalt cement, will lose its identity and cannot be differentiated from the asphalt cement in which it was initially blended.

II. Modified Asphalt Containment Binder

The unique nature of the modified asphalt containment binder is due to several features that combine to provide the properties needed. Most conventional asphalt binders or cements are not modified. If they are modified (usually with polymers), it is to upgrade a poor quality asphalt to meet the local and national highway standards for highway use. Modified asphalt containment binder is not dependent on Performance Grade (PG) requirements, but has its own unique requirements. In order to meet these requirements, the base asphalt cement must be highly modified in a specific manner.

A. Desirable Properties of the Modified Asphalt Containment Binder Include at Least the Following 1. Temperature stability. The binder may be heated to high temperature (500 F) during mixing and handling, and must maintain its properties without undue aging. Also, the binder may be allowed to cool in a tank, and then be re-heated.
2. Ease of preparation. Blending of the base asphalt and polymers generally requires a high shear mixer, but with the proper selection of materials, this may not be required.
3. Improved asphalt compatibility. The properties of base asphalt cement are source (crude oil) specific. Some sources are not compatible with modifiers, while others are only marginally so. The best modifiers are those that are compatible with a wide range of asphalt sources. Also, selection of the best sources of asphalt cement or base asphalt becomes an important part of making a modified asphalt containment binder; part of the process is to test and reject those asphalts that will not make a suitable modified asphalt containment binder. On occasion, to reduce hauling costs, a concentrate of good asphalt binder and modifiers may be shipped to the project hot mix plant and then "let down" with locally available asphalt cement.
4. Fuel and oil resistance. Neat asphalt is soluble in most hydrocarbon fuels such as gasoline. Components in the modifiers should be used that will reduce this solubility.
5. Improved weathering. Oxidation and volatilization are the primary actions that degrade asphalt over long time periods. Any material additives or modifiers and processes that will reduce this aging are desirable.
6. Cost. The cost of asphalt cement generally mirrors that of crude oil, and may also vary somewhat among local market areas, and is thus not controllable. The cost of modifiers may be minimized by the selection of less costly materials, and by reducing the type and the amount required to achieve the desired properties.
7. Reduced viscosity. In order to make a suitable binder, some asphalt cements require a larger amount of polymer modifier. This, in turn, increases the viscosity at the normal mixing temperature. Modified asphalt mixtures generally require higher mixing temperature than conventional asphalt, but in order to reduce the viscosity (say 360 F vs. 300 F) enough to achieve compaction (low air voids), the temperature may need to be raised in the mix plant to the point where it is damaging to both the equipment and the binder. Selection of the proper modifier reduces viscosity for compaction without the need for abnormally high temperatures.

The binder properties directly affect the mixture properties when combined with aggregate. The following factors are important in that the modified binder has direct impact on the performance of the final modified asphalt containment Hot Mix Asphalt (HMA). These include the following:

8. Improved mix stability. Resistance to creep deformation under standing loads and heavy traffic, especially during hot weather is a key reason to use modifiers. Some modifiers do a better job than others, so the selection is important.
9. Improved thermal crack resistance. Thermal cracks tend to occur in cold climates and when using harder base asphalts. Using the proper modifier will reduce or eliminate the tendency to crack.
10. Improved fatigue crack resistance. More elastic binders will allow higher repetitions of load without cracking. Additionally, a higher binder content and low void content in the mixture will increase fatigue resistance.
11. Improved resistance to aging. As indicated above, the aging or hardening due to oxidation and volatilization of the binder directly affects the mixture.
12. Reduced water susceptibility. Stripping is a serious problem with some asphalt-aggregate combinations. The better modifiers coupled with anti-strip additives will improve the resistance to stripping. There are several popular liquid chemical anti-strip additives on the market, but they often interfere with the other modifiers such as polymer, particularly by reducing viscosity or stiffness. Therefore, if stripping is a problem, the use of lime is the preferred anti-strip additive, added to either the aggregate or binder, depending on the outcome of the mix design evaluation.

B. Binder Selection and Formulation

The binder selection and formulation involves several steps as follows:

1. For a given project, select an asphalt base stock from a source with good qualities that can be modified effectively. This selection is usually made by evaluating the local suppliers and obtaining samples of their base stocks, which may actually be a combination of sources. Each source material, say an AC-5 from one source and another asphalt that is used to change the properties when blended, so that a particular PG grade may be produced. Samples from each source used by the supplier are obtained and sent to the laboratory.

2. Select the most appropriate asphalt modifier for the base asphalt. The preferred modifier (combination) is based on optimizing the desirable properties listed above. Although there are myriad polymers on the market, they do not all work equally well, and often not at all with some asphalts. A series of formulations are tried in the laboratory until the optimum blend of asphalts and modifiers is achieved, based on the properties required. FIG. 6 is a guide for a typical blending process to develop a suitable binder. Modifiers include elastomers, plastomers and waxes, and various combinations of these. Exemplary elastomers, plastomers and waxes include: ESI, ethylene-styrene-interpolymer; SBS, Styrene Butadiene Styrene; SEBS, Styrene Ethylene Butadiene Styrene; EVA, Ethylene Vinyl Acetate; Wax, Sasobit; L 606, and Hydrocarbon resin, in various combinations.

3. Prepare a "recipe" or formula for mixing and preparing the final modified asphalt containment binder, to be used by the supplier selected to make the modified asphalt containment binder. One exemplary example is shown in FIG. 6.

C. Aggregate Selection

1. The mineral aggregate makes up about 93 percent of the mass and the binder about 7 percent, so the aggregate plays a significant role. Generally, the source of aggregate is local, to reduce hauling costs, but if high quality material is not locally available, it may need to be imported. An exemplary Aggregate Gradation is illustrated in FIG. 7.

2. Samples of the aggregate from each stockpile are sent to the laboratory for evaluation. Tests include physical properties as well as evaluation in the mix design or Job Mix Formula (JMF). Controlled properties are as follows:

| | |
|---|---|
| L.A. Abrasion loss (ASTM C 131) | 30% max. loss |
| Specific Gravity and Absorption | 2% max. absorption |
| Fine aggregate (ASTM C 128) | |
| Coarse aggregate (ASTM C 127) | |
| Sand Equivalent (ASTM D 2419) | 40% min. |
| Fractured faces (ASTM D5821) | 75% min. on each sieve size greater than No. 10 |
| Gradation or sieve analysis (ASTM C 136) | See FIG. 7 |
| Dense graded impermeable layer | |
| Open graded drainage layer | |
| Determine the proportion of each stockpile required to meet the gradation specification. | |

D. Mix Design

1. When the modified asphalt containment binder has been ascertained and formulated, and the aggregates tested and graded, the proportions of binder and aggregate are determined using a series of steps and criteria. The resulting Job Mix Formula (JMF) is then used to proportion all ingredients.

The process used in the Mix Design is to heat pre-weighed binder and aggregates over a range of binder contents, compact (using the Marshall procedure) each sample into 4-in. diam. briquettes, and then perform several tests on these specimens. The results are compared to criteria established for modified asphalt containment HMA. The key properties include:

Aggregate gradation

Binder viscosity vs. temperature relationship to determine the mixing and compaction temperatures.

Tensile strength ratio (TSR) (MSHTO T-283) to determine need for anti-strip additive (lime preferred). This ratio should be less than 80%.

The optimum binder content is a compromise among several properties, including:

Density. Approximately the peak of the curve.

Air voids. Less than 3% by volume.

Voids filled with asphalt (VFA).

Voids in the Mineral Aggregate (VMA). Optimal near the minimum.

Hydraulic Conductivity (permeability) (ASTM D 5084) In the mix design phase, this data is used to determine the relative ease in compaction over a range of blows of the compaction hammer. The criteria is generalized in that the object is to achieve the minimum 3% air voids (and the required low permeability) without excessive compaction effort.

Resilient Modulus (ASTM D 4123) This value replaces the conventional Marshall Stability because it is useful not only in comparing mix combinations, but also is used in computing the load carrying capacity. A value of approximately 200,000 psi is desirable.

III. Construction

The construction of the modified asphalt for containment includes several actions, including the actual construction, QC/QA, test strips (preferred), connection to other environmental covers/caps such as membranes, hot and cold joints, etc. The following are key elements to be addressed:

A. Inspection of the HMA Facility (hot mix plant). A qualified engineer will visit and inspect the plant, using the Guide Specifications along with the Quality Control Plan, which includes forms to be completed as information is obtained. The goal is to be sure that the plant has all the necessary controls, capacity, and are all calibrated and certified.

B. Inspection of the construction site. Ascertain that the site meets specifications for smoothness (+/−0.5 in. in 10 ft.) and firmness, ready to pave. The recommended minimum cross-slope grade for water runoff is 1.5%. The maximum slope for paving is 25% (1:4), although 20% would be preferred.

C. A pre-construction meeting and instruction to the contractor personnel is required before construction starts. The supervisors and crew are apprised of the difference between modified asphalt for containment and conventional pavement, and what they will need to do to meet the specifications.

D. A test strip is preferred to finalize and fine-tune the JMF, to develop appropriate rolling patterns to get the low air voids required. Ideally, this test strip is constructed one or more days prior to construction in order to provide sufficient time to sample and test the modified asphalt containment HMA. Alternatively, the first paving pass in a non critical area may be used for the test strip if time or other circumstances do not permit a full test strip. Note that all standard dense (low permeability) modified asphalt for containment is nominally 4 in. thick.

E. A QC engineer/technician is on site to receive and accept each truckload of modified asphalt HMA as it arrives on the jobsite. Temperature is an important issue, and each load is tested, and accepted or rejected. Also, the location of the modified asphalt for containment HMA from each truck is noted and coordinated with the ongoing nuclear density testing, resulting in a grid of paving passes, truckloads, and density readings that will accurately represent the modified asphalt in place.

F. A technician using a non-destructive nuclear density gauge will test and monitor each truckload of modified asphalt as it is being compacted. Rolling will continue until the specifications are met, with all modified asphalt containment HMA compacted to a final condition of less than 3% air voids.

G. A core sample (or replicates) may optionally be cut and tested to assure that the density/voids requirement was achieved. Note that it may not be advisable to cut core samples from an environmental cap, even though it can be back-filled satisfactorily.

In summary, the steps for construction are as follows:
1. Blend binder and aggregate materials at the HMA Facility
2. Haul to the jobsite
3. Spread with a standard paving machine and/or by hand in close quarters
4. Monitor the temperature
5. Compact using standard vibratory steel wheel rollers and or pneumatic tired rollers
6. Monitor the density/voids of mat and hot joints using a nuclear gauge
7. Final smoothing and removal of roller marks
8. Optional core sampling
9. Prepare QA report.

IV. Alternative Embodiments

There are several design features that may optionally be included according to aspects of the present invention.

Dense and Open Graded Modified Asphalt Containment. A modified asphalt containment system of liners and caps may consist of one or more layers. A liner or cap typically is 4 in. thick and is constructed with the modified asphalt containment binder and dense-graded aggregate to make a mat that has less than 3% air voids and has low permeability (k<1× 10-8 cm/sec): Alternatively, the liner or cap may be in the range of 2 in. to 10 in. thick depending on design considerations. Further, multiple mats of modified asphalt may be used.

Alternatively, an open-graded version is also typically 4 in. thick, but is made with modified asphalt containment binder and open-graded aggregate, resulting in about 20 to 30% air voids and permeability coefficient of about 1 to $3 \times 10^{-1}$ cm/sec (very free flowing), and is used for leachate collection and transport as well as leak detection. A typical "double liner" might consist of a 4 in. open-graded layer sandwiched between two 4 in. dense-graded layers.

Joints. Both hot and cold joints will generally be required due to the nature of HMA installation.

A hot joint is made by hot-lapping each panel as the paving machine passes by the previously paved panel. Generally, a joint is maintained hot by paving only short strips (200 ft.) before moving the paver back and starting another panel. This prevents the mat from cooling too much, and a good hot joint is attained. The modified asphalt specs do not recognize a different air void or density requirement for hot joints. The hot joints and main mat must all meet the same air void requirement of <3%, in order for the system to maintain a seamless cap or liner.

A cold joint is required when the final panel of the day or that area is to be placed. FIG. 2 illustrates an exemplary cold joint. This final 10-ft. wide panel is stepped down 1 in. at the hot joint side and then tapered from 3 in. thick to 2 in. thick over the 10 ft. wide panel. A sketch of this cross-section is shown in FIG. 2. Later, usually the following morning when the paving is resumed, the area adjacent to the 1-in. step is milled or planed off, removing the modified asphalt containment surface 1-in. deep and 12-in. wide. This milled surface, and the surface of the 10-ft. wide cold panel is heavily tacked or coated with asphalt just prior to paving with a new hot panel overlay on top of the cold panel. This process removes the lower density material that is difficult to compact and replaces it with fresh hot modified asphalt containment that can be more readily compacted into the cold edge notch. A cold joint constructed in this configuration and tested for permeability, will meet the 1×10-8 cm/sec requirement.

Figure 4:
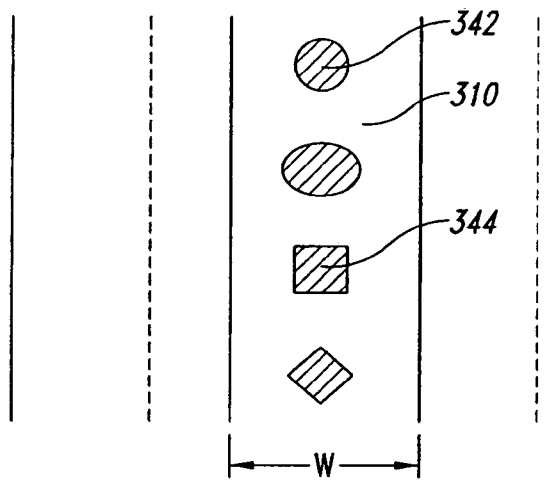
FIG. 4 is a plan view of the membrane tie-in along line 4-4 of FIG. 3 according to principles of the present invention.

Interface with HDPE. The design of a construction tie-in joint between the modified asphalt and adjoining flexible geomembranes such as HDPE is shown in FIG. 3. Some projects require a basin or slope that is too steep for modified asphalt containment to be constructed, so there is a need to tie modified asphalt containment together with the HDPE. Traditionally, design engineers anchor the HDPE behind a portland cement concrete curb or wall, but this is a complicated solution. The modified asphalt containment method is to sandwich the HDPE between two layers of dense modified asphalt containment. A cold panel is constructed first, and then the entire surface is coated with asphalt tack. "Windows" or openings are cut through the overlapped HDPE so that when the hot overlay of modified asphalt is placed, the two modified asphalt surfaces bond together, forming a strong interface that will not tear out or slip. Alternate designs for the window or opening are shown in FIG. 4, such as an ellipse with the long axis perpendicular to the edge.

V. Structural Property Advantages

The present invention offers numerous advantages over conventional geosynthetic, membrane, multi-layer or clay liners. According to aspects of the present containment system, a system of containment is provided that is cost-effective, meets stringent EPA standards, is resistant to erosion, remains stable on slopes and conforms to minor site settlement, is resilient over a wide range of temperature variations and is not subject to damage under UV light exposure, offers longevity, ease of maintenance and inspection, provides a thinner cross-section requiring less material import and more storage space, fast installation with conventional construction equipment, and allows reuse of the site for a variety of potential alternative uses: parking, equipment storage, truck/train intermodal facilities, multi-use sports facilities, and the like.

Installation of the present system involves conventional construction equipment and conventional hot mix facilities. Material mixing and placement costs are therefore significantly reduced over other novel containment systems requiring specialized equipment.

The permeability coefficient of the present system is less than $1 \times 10^{-7}$ cm/sec. The present system achieves this low permeability by reducing air voids to a level where the air voids do not interconnect. Impermeable asphalt can be made simply by increasing the binder content (conventional asphalt) to reduce air voids, but this results in a mix that is too soft to bear loads. Further, this "hydraulic" asphalt is subject to ultra-violet light and oxidative degradation. The present system optimizes the modified binder both in volume and in content, thus providing a load bearing system that is resistive to UV light, oxidative degradation and permeability.

Figure 8:
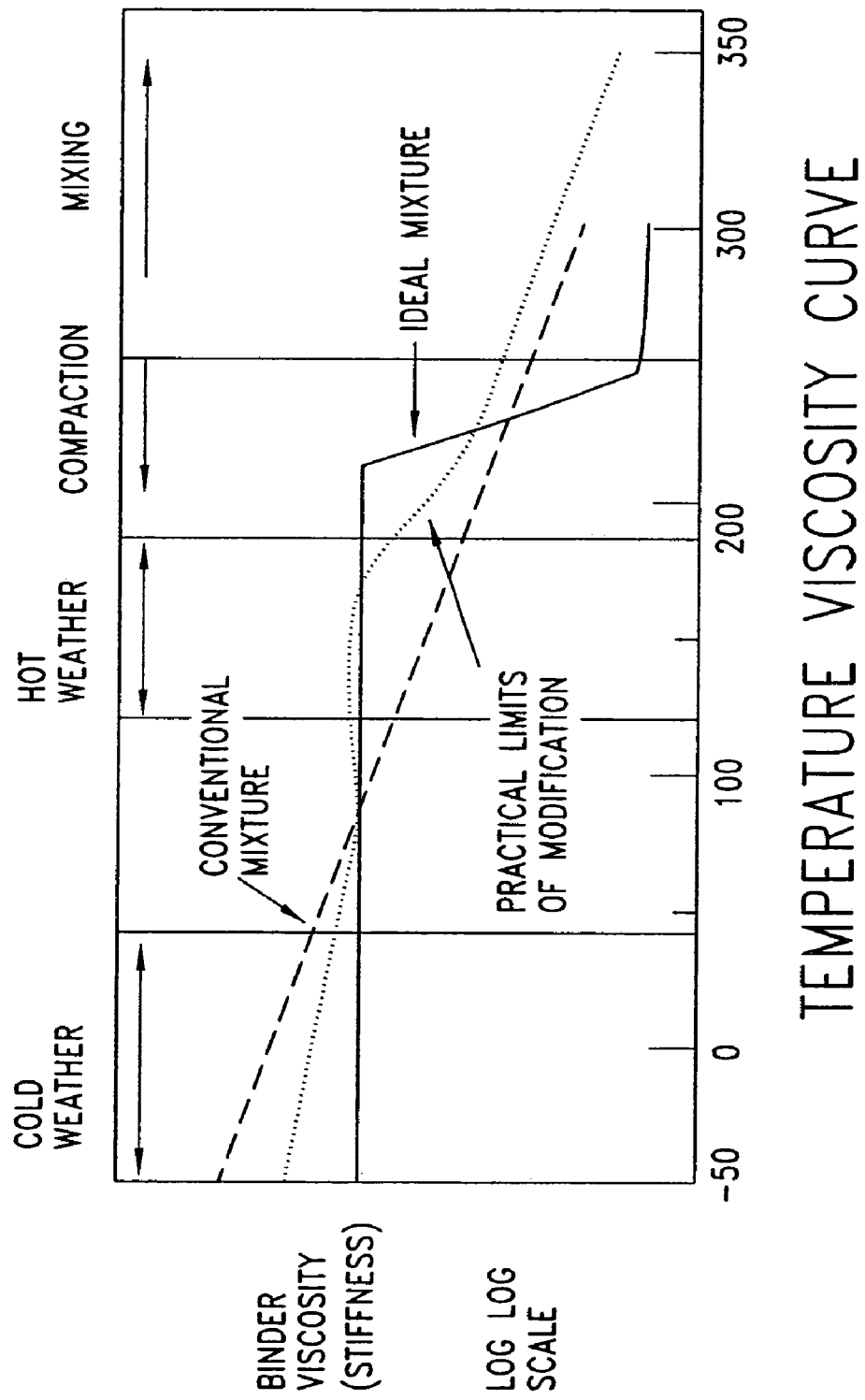
FIG. 8 is a Temperature versus Viscosity Graph for conventional asphalt binder and for the modified asphalt binder of the present invention according to principles of the present invention.

As illustrated in the Temperature/Viscosity Graph shown in FIG. 8, the modified asphalt of the instant invention is resistant to a much wider range of temperature fluctuation than conventional asphalt. As depicted by the dashed line in FIG. 8, conventional asphalt is a liquid at 300° F. when it is mixed, but at very low temperatures it can be as brittle as glass. An ideal binder would look like the solid line, with the same viscosity or stiffness at all temperatures below that required for mixing. While that is not possible, the dotted line shows how the modified asphalt of the present invention both increases stiffness in hot weather and elasticity in arctic climates.

As shown in FIGS. 9A and 9B, further testing has verified the ability of the modified asphalt mixture to conform to underlying conditions such as differential settlement. A nominal 4-inch layer of the present system will deflect more than three times as much as conventional pavement without cracking.

As shown in FIG. 9A, the differential settlement test was conducted with a beam 910 measuring 4 inches wide, 4 inches high, and 36 inches long which was sawed from a modified asphalt cap of the present invention. It was carefully placed on a sand bed 920 in a testing frame 950 as shown in FIG. 9A. The sand bed 920 was supported by a wood frame 940. The test set-up 900 is designed to simulate differential settlement by permitting removal of sand very slowly over time. A "valve" 930 at the bottom allows the dry sand to flow, as in an hour-glass. A single test may take a month or more. It appears that a rate of about one (1) mm per day at room temperature (about 75° F.) is appropriate. Although the test was designed to incorporate a surcharge weight (bricks) 960, it was discovered that the dead weight of the modified asphalt beam (~150 lb./cubic foot) was adequate.

FIG. 9B shows a beam at the beginning of the test and again near the conclusion. During the testing period of three months, no cracks occurred, even up to a total center deflection D of 1.5 inches. FIG. 9C shows the test results.

This test readily demonstrates that the modified asphalt layers can withstand considerable bending due to settlement without damage.

FIG. 10 illustrates a graph of thermal cracking by graphing tensile stress versus temperature. The modified asphalt fails at a higher stress (stronger) and at a lower temperature. This temperature difference (see A) indicates that a lower temperature is required to break the specimen and thus higher resistance to low temperature cracking. However, all binders eventually approach the very low "glass transition temperature."

At higher temperatures, but still below freezing, the mixtures can also fail by cracking due to repeated temperature changes, such as diurnal temperature change in high desert areas. This temperature region is often over a wider range, indicating that the modified asphalt mixture is more resistant to cracking because of its higher tensile strength. The greater difference between the conventional asphalt and the modified asphalt in the B range further indicates that the modified asphalt is more effective in resisting cracking because the curve is flatter in this range.

The resilient modulus of the modified asphalt cap of the present invention has been tested at 2,048 megapascals (Mpa) compared to 3,200 Mpa for the conventional asphalt cover at cold temperatures (−20° C.). This reduced modulus suggests that the modified asphalt of the present invention is more flexible and less susceptible to cracking at cold temperatures.

The practical consequence of these structural properties is that the modified asphalt for containment caps has the ability to perform within a wide range of temperatures and loadings by resisting deformation under extremes of these parameters.

FIG. 11 illustrates an exemplary range for the various components of the modified asphalt. FIG. 11 further includes actual job specifications for projects A-H. In yet other alternative embodiments, such as sites that will receive heavy loading; for example, log yards, port facilities, metal scrap yards and intermodal facilities, a ¾ inch to 1 inch aggregate may be used. Additionally, sites that will receive heavy loading may receive a $4^{1/2}$ inch or more nominal max thickness.

The structural property advantages are further illustrated in FIGS. 12 through 16. In these figures, the modified asphalt is compared to conventional asphalt with regard to various performance criteria. FIG. 12 illustrates the deflection depth against a distance from the center of loading for both conventional asphalt and for the modified asphalt. FIG. 13 illustrates the surface temperature versus stiffness for both conventional asphalt and for the modified asphalt of the present invention. The modified asphalt exhibits significantly more consistent stiffness readings and higher compliance (lower stiffness) over a wide range of temperatures. FIG. 14 illustrates the pavement temperature versus stiffness for both conventional asphalt and for the modified asphalt of the present invention. FIG. 15 illustrates mastercurves for conventional asphalt and modified asphalt. From this data set, it is possible to estimate the stiffness characteristics over a wide range of temperatures, loading times (or frequencies) using rheological analysis techniques. FIG. 16 illustrates the tensile load versus time for conventional asphalt and modified asphalt at various temperatures. As can be seen from each of these comparisons, modified asphalt provides significantly different performance characteristics as compared to conventional asphalt.

EXEMPLARY INSTALLATION SPECIFICATIONS

I. Introduction

These guidelines have been adapted from specifications for constructing conventional hot mix asphalt pavements. An advantageous feature of the modified asphalt is that the materials and placement can be accomplished using equipment and procedures readily available throughout the U.S. and normally used for producing Hot Mix Asphalt (HMA).

II. Modified Asphalt Production

A. Description

This work shall consist of one or more courses of open or dense graded modified asphalt placed on a prepared foundation or base in accordance with these Specifications and in conformity with the lines, grades, thicknesses, and typical cross-sections shown in the Plans.

The modified asphalt shall be composed of the modified asphalt binder and aggregate which, with or without the addition of mineral filler and blending sand as may be required, shall be mixed in the proportions specified to provide a homogeneous, stable, and workable mixture.

B. Materials

Materials shall meet the requirements of the following sections:
  The Modified Asphalt Binder
  Anti-Stripping Additive
  Aggregates
  Blending Sand
  Mineral Filler
  The binder will be pumped into empty storage tanks.
  Mineral materials include coarse and fine aggregates, blending sand, and mineral filler.
  Production of aggregates shall comply with the requirements herein.
  The stockpiling of aggregates, and the removal of aggregates from stockpiles shall comply with the requirements herein.

III. Construction Requirements

A. Mixing Plant

Sufficient storage space shall be provided for each size of aggregate. The different aggregate sizes shall be kept separated until they have been delivered to the cold elevator feeding the plant except that aggregates produced meeting these requirements need not be separated. The storage yard shall be maintained neat and orderly and the separate stockpiles shall be readily accessible for sampling.

Plants used for the preparation of the modified asphalt shall conform to all requirements herein except that scale requirements shall apply only where weight proportioning is used. In addition, batch plants shall conform to the requirements herein; and rotary drum plants shall conform to the requirements herein.

B. Requirements for the Exemplary HMA Facility

The plant shall meet the following requirements:
  1. The asphalt plant shall have a minimum capacity rating by the manufacture as follows:
  For projects involving 5,000 tons or more:
  Batch plants—2,000 lbs. per batch.
  Continuous mix and rotary drum plants —100 tons per hour.
  For projects involving less than 5,000 tons:
  Batch plants—1,000 lbs. per batch.
  Continuous mix and rotary drum plants—45 tons per hour.
  2. Scales. Plant and truck scales shall meet the requirements herein for calibration and certification.
  3. Equipment for storage of the modified asphalt binder.
  Tanks for the storage modified asphalt binder shall be equipped to heat and hold the material at the required temperatures. Typical storage temperatures for the modified asphalt binder range between 310 F and 360 F. Steam coils, electricity, other approved means, shall accomplish the heating so that no flame shall be in contact with the tank. The circulating system for the binder material shall be designed to ensure proper and continuous circulation during the operating period. Provision shall be made for measuring the binder in the storage tank and a valve shall be placed in the supply line to the mixer for sampling the material.
  4. Feeder for drier or drum mixer. The plant shall be provided with accurate mechanical means for uniformly feeding the aggregate into the drier so that uniform production and uniform temperature will be obtained. The feeder for blending sand, when required shall be capable of providing a consistent, uniform flow.
  5. Screens. Plant screens, capable of screening all aggregates to the specified sizes and proportions and having normal capacities in excess of the full capacity of the mixer, shall be provided when batch plants are used.
  6. Bins. The plant shall include storage bins of sufficient capacity to supply the mixer when it is operating at full capacity. Bins shall be arranged to ensure separate and adequate storage of appropriate fractions of the aggregates. Separate dry storage shall be provided for mineral filler when used and the plant shall be equipped to feed such material into the mixer. Each bin shall be provided with overflow pipes, sized and located to prevent material backing up into other compartments or bins. Each compartment shall be provided with an outlet gate, constructed so there shall be no leakage when closed. The gates shall close quickly and completely. Bins shall be constructed so samples can be readily obtained. Bins shall be equipped with adequate telltale devices to indicate the level of the aggregates in the bins at the lower quarter points.
  7. Binder control unit. Satisfactory means, either by weighing or metering, shall be provided to obtain the proper amount of the modified asphalt binder in the mix. Means shall be provided for checking the quantity or rate of flow of the modified asphalt binder into the mixer.
  The binder may also be proportioned by a device which sprays the material into the mixer through six or more nozzles, and which weighs or proportions the material for each batch by a positive rotating meter that is calibrated in pounds. The metering device shall have an established background of service.
  8. Thermometric equipment. An armored thermometer of adequate range in temperature reading shall be fixed in the modified asphalt binder feed line at a suitable location near the charging valve at the mixer unit.
  The plant shall also be equipped with either an approved dial-scale, a mercury actuated thermometer, an electric pyrometer, or other approved thermometric instrument placed at the discharge chute of the drier to automatically register or indicate the temperature of the heated aggregates. This device shall be in full view of the plant operator.

9. Dust collector. The plant shall be equipped with a dust collector constructed to waste or return uniformly to the hot elevator all or any part of the material collected.
10. When a baghouse is used for dust control, the Contractor shall be able to introduce the material returned from the baghouse into the mixture at a uniform and continuous rate. Accurate mechanical means shall be provided for uniformly feeding the fines into the aggregate stream. To accomplish this, the Contractor shall provide a surge hopper with a holding capacity sufficient to accumulate the baghouse fines or shall have a variable speed mechanical feed interlocked to the plant that will prevent any variance in feed into the aggregate stream. Either method shall provide uniform and continuous return of the well-graded fine materials and be provided with a method of withdrawing the surplus fines independently for disposal.
11. Burner fuel. The plant burner fuel shall be restricted to the use of propane, butane, natural gas, methane, coal, No. 1 or No. 2 fuel oil, or other acceptable burner fuel.
12. Hot-mix asphalt facilities shall be in compliance with all local, state, and federal operating permits, licenses, air quality and other applicable regulations.

C. Requirements for Batch Facilities

In addition to the requirements listed under Section 2-01.3 (1)A, batch plants optimally have the following requirements:

1. The plant shall include a dryer or dryers that continuously agitate the aggregate during the heating and drying process, and be capable of preparing aggregates to specification requirements.
2. Weigh box or hopper. The equipment shall include a means for accurately weighing each size of aggregate in a weigh box or hopper suspended on scales and of ample size to hold a full batch without hand raking or running over. The gate shall close tightly so that no material is allowed to leak into the mixer while a batch is being weighed.
3. The modified asphalt binder control. The equipment used to measure the binder shall be accurate to plus or minus 0.5 percent. The binder bucket shall be a non-tilting type with a loose sheet metal cover. The length of the discharge opening or spray bar shall be not less than 75 percent of the length of the mixer and it shall discharge directly into the mixer. The binder bucket, its discharge valve or valves and spray bar shall be adequately heated. Steam jackets, if used, shall be efficiently drained and all connections shall be constructed so they will not interfere with the efficient operation of the asphalt scales. The capacity of the binder bucket shall be at least 15 percent in excess of the weight of binder material required in any batch. The plant shall have an adequately heated quick-acting, non-drip, charging valve located directly over the asphalt material bucket.

The indicator dial shall have a capacity of at least 15 percent in excess of the quantity of binder material used in a batch. The controls shall be constructed so they may be locked at any dial setting and will automatically reset to that reading after the addition of binder material to each batch. The dial shall be in full view of the mixer operator. The flow of binder material shall be automatically controlled so it will begin when the dry mixing period is over. All of the binder material required for one batch shall be discharged in not more than 15 seconds after the flow has started. The size and spacing of the spray bar openings shall provide a uniform application of binder material the full length of the mixer. The section of the binder line between the charging valve and the spray bar shall be provided with a valve and outlet for checking the meter when a metering device is substituted for a binder material bucket.

4. Mixer. The batch mixer shall be an approved type capable of producing a uniform mixture meeting the requirements of these specifications. If not enclosed, the mixer box shall be equipped with a dust hood to prevent loss of dust.
5. Clearance of the blades from all faced and moving parts shall not exceed 1 inch unless the maximum diameter of the aggregate in the mix exceeds 1½ inches, in which case the clearance shall not exceed 1½ inches
6. Mixing time. The plant shall be capable of regulation of the mixing time as specified herein in 5-second increments.
7. Automatic controls. All projects using a batch mixer involving 5,000 tons or more of the modified asphalt shall conform to the following provisions. Automatic control of batch mixing operations may be used providing the requirements of this section are met.

The proportioning and timing devices shall be automatic to the extent that the only manual operation required for the proportioning and mixing of materials for one batch shall be a single operation of a switch or starter. The mixing plant shall be equipped with automatic weight proportioning devices to monitor and control the weights of the several components of aggregates and of the asphalt. The mixing plant shall also contain timing lock devices to monitor and control the position of the aggregate weigh hopper dump gate, the asphalt bucket discharge valve, and the mixer discharge gate.

Withdrawal from the aggregate bins and the discharge of the weigh hopper shall be so interlocked that the weigh hopper cannot discharge until the required quantity of aggregate from each bin has been deposited therein. The weigh hopper may be a single compartment, individual weight control type, or of the divided compartment, preset volume type. When the single compartment, individual weight control type is used, the automatic scale weight system shall discharge and weigh material from one bin at a time. When the preset volume weigh hopper is used, the automatic control system shall check the total weight of each aggregate batch and provision shall be made to allow a check easily and quickly of the individual aggregate weights at any time.

The opening of the aggregate weigh hopper dump gate shall actuate the timing lock devices. They shall lock the asphalt bucket discharge valve until preset dry mixing time is expired and shall lock the mixer discharge gate throughout the preset dry and wet mixing periods. The control of the timing shall be flexible and capable of being set at intervals of not more than 5 seconds throughout cycles up to 60 seconds.

D. Requirements for Drum Mixer Facilities

In addition to the requirements listed herein, drum mixer plants shall meet the following requirements:

1. The plant shall have a feeder capable of uniformly introducing the aggregate into the drum. The aggregate feeder shall be synchronized with the modified asphalt binder material feed. Satisfactory means shall be provided to afford positive interlocking control between each aggregate cold feed bin, aggregate feed, and the asphalt feed so the plant will automatically activate a warning device if the feed of either aggregate or asphalt is interrupted.
2. The plant shall have the mixing capability to provide a uniform mixture.
3. The asphalt material feed shall have positive recording capabilities so the amount of asphalt incorporated into the mix during any given period of time may be read directly.

IV. Equipment

A. Hauling Equipment

Trucks used for hauling the modified asphalt mixtures shall have tight, clean, smooth metal beds which have been thinly coated with a minimum amount of paraffin oil, or other approved material to prevent the mixture from adhering to the beds. Each truck shall have a cover of canvas or other suitable material of sufficient size to protect the mixture from the weather.

B. Pavers

The modified asphalt pavers shall be self-contained, power-propelled units, provided with an activated screed or strike-off assembly, heated if necessary, and capable of spreading and finishing courses of the modified asphalt in panel widths applicable to the specified typical section and thicknesses.

The screed or strike-off assembly shall effectively produce a finished surface of the required evenness and texture without tearing, shoving, segregating, or gouging the mixture. Any bolt on or hydraulic extensions shall produce the same results including ride, density, and surface texture as the screed or strike off assembly. Hydraulic extenders without screeds, augers, and vibration shall not be used.

When laying mixtures, the paver shall be operated at a uniform forward speed consistent with the plant production rate and roller train capacity to result in a continuous operation. The auger speed and flight gate opening shall be adjusted to coordinate with the operation.

The transverse slope controller shall be capable of maintaining the screed at the desired slope within plus or minus 0.1 percent. The paver shall be equipped with automatic feeder controls, properly adjusted to maintain a uniform depth of material ahead of the screed.

C. Rollers

Rollers shall be of the steel wheel, vibratory, or pneumatic tire type, in good condition, capable of reversing without backlash, and shall be operated at speeds slow enough to avoid displacement of the mixture. The number and weight of rollers shall be sufficient to compact the mixture as required herein. The use of equipment, which results in excessive crushing of the aggregate, will not be permitted. Rollers producing pickup, washboard, uneven compaction of the surface or other undesirable results will be rejected. Compaction, in areas too small for the use of conventional sized rollers, shall be achieved using vibratory plate compactors or other approved equipment.

The following specifications shall apply to the various types of rollers:

1. Vibratory Steel Wheel Rollers
   a. Variable amplitude will be required, with at least 2 settings.
   b. A variable frequency with a 2,000 VPM minimum.
   c. The maximum rate of travel under vibration shall be limited to 3 mph. The maximum rate of travel without vibration shall be limited to 4 mph.
2. Pneumatic Tired Rollers
   a. The maximum rate of travel shall be limited to 5 mph.
   b. Skirts shall be firmly affixed to the perimeter of the roller and shall uniformly extend to within 1 inch of the pavement surface.
   c. Pneumatic propulsion on surface courses shall be limited to smooth tires that will not leave visible tracks.

V. Preparation

A. Preparation of Existing Surfaces

Before construction of a modified asphalt liner or cap system, the existing surface will be constructed to plan subgrade elevations with a tolerance of +/−one half inch, and brought to a firm and unyielding condition as evidenced by proof rolling with a loaded tandem rear-axle dump truck. Further, the surface must be capable of maintaining its smooth and unyielding condition when loaded repeatedly by the modified asphalt mixture delivery trucks and paving equipment. Alternatively, a falling weight deflectometer may be used to test the subgrade for uniformity of load bearing capacity.

B. Heating of the Modified Asphalt Mixture

The modified asphalt mixture shall be heated to a range between 310° F. and 360° F. as determined by the mix design. The asphalt shall be heated in a manner that will avoid local overheating and provide a continuous supply of asphalt material to the mixer at a uniform temperature plus or minus 10° F. from the mix design temperature.

C. Preparation of Aggregates

The aggregates shall be removed from stockpiles) in a manner to ensure a minimum of segregation when being moved to the modified asphalt plant for processing into the final mixture.

D. Mix Design

A representative sample is obtained from mineral aggregate stockpiles and blend sand sources to be used for the modified asphalt production, submitting them for development of a mix design and job mix formula.

At least 20 working days are needed for approval of the mix design once the material has been received. Additional time may be required if the proportions will not make an adequate design. The Contractor is also advised that production of the modified asphalt shall not commence until the job mix design has been established.

E. Acceptance Sampling and Testing

1. General. The modified asphalt dense graded mixtures will be evaluated for quality of gradation and binder content. The modified asphalt open graded mixtures will be evaluated for quality of gradation only based on samples taken from the cold feed.
2. Aggregates. Aggregates will be accepted for sand equivalent and fracture based on their conformance to the requirements herein.
3. Modified Asphalt Mixture
   a. Sampling
      (1) A sample will not be obtained from either the first or last 25 tons of mix produced in each production shift.
      (2) Samples for compliance of gradation and asphalt cement content will be obtained on a random basis from the hauling vehicle.

b. Definition of Sampling: Sampling and testing for acceptance shall be performed on a random basis at a minimum frequency of one sample for each sublot of 400 tons or each day's production, whichever is least. When proposed quantities exceed 1,200 tons for a class of mix, sublot size shall be determined to the nearest 100 tons to provide not less than three uniform sized sublots, based on proposed quantities, with a maximum sublot size of 800 tons.

c. Reject Mixture
  (1) Rejection by Contractor. The Contractor may, prior to sampling, elect to remove any defective material and replace it with new material at no expense to the Contracting Agency. Any such new material will be sampled, tested, and evaluated for acceptance.
  (2) Rejection without Testing. A batch may, without sampling, be rejected, including a load, or section of the cap or liner that appears defective in gradation or the modified asphalt binder content. Material rejected before placement shall not be incorporated into the work. Any rejected section of the work shall be removed.

VI. Mixing

The prepared aggregates shall be combined in the mixer in the amount of each fraction of aggregates as specified herein. The asphalt material shall be measured or gauged and introduced into the mixer in the amount determined herein.

After the required amounts of aggregate and asphalt material have been introduced into the mixer, unless otherwise specified, the materials shall be mixed until a complete and uniform coating of the particles and a thorough distribution of the asphalt material throughout the aggregate is ensured. Wet mixing time shall be sufficient to produce 95 percent coated particles. When discharged, the temperature of the mix shall not exceed the mix design temperature. A maximum water content of 2 percent in the mix, at discharge, will be allowed providing the water causes no problems with handling, stripping, or flushing.

Storing or holding of the asphalt concrete mixture in approved storage facilities will be permitted during the daily operation but in no event shall the materials be held for more than 2 hours. Materials held for more than 2 hours after mixing shall be rejected and disposed of by the Contractor at no expense to the Contracting Agency. The storage facility shall have a visible device located at the top of the cone or about the third point to indicate the amount of material in storage. No material shall be accepted from the storage facility when the material in storage is below the top of the cone of the storage facility, except at the end of the working day.

VII. Spreading and Finishing

The mixture shall be laid upon an approved surface, spread, and struck off to the grade and elevation established. Asphalt pavers complying with Section 2-01.3(3) shall be used to distribute the mixture. Unless otherwise specified in the Plans or in the Special Provisions, the nominal compacted depth of any layer of any course shall not be less than the following depths:

| | |
|---|---|
| Modified Asphalt Dense Graded | 4 inches |
| Modified Asphalt Open Graded | 4 inches |

On areas where irregularities or unavoidable obstacles make the use of mechanical spreading and finishing equipment impractical, the paving may be done with other equipment or by hand. When the modified asphalt mixture is being produced by more than one plant, the material produced by each, plant shall be placed by separate spreading and compacting equipment.

VII. Compaction

Immediately after the modified asphalt has been spread, struck off, and surface irregularities adjusted, it shall be thoroughly and uniformly compacted. The completed course shall be free from ridges, ruts, humps, depressions, objectionable marks, or irregularities and in conformance with the line, grade, and cross-section shown in the Plans.

Compaction shall take place when the mixture is in the proper condition so that no undue displacement, cracking, or shoving occurs. All compaction units shall be operated at the speed, within specification limits, that will produce the required compaction. Areas inaccessible to large compaction equipment shall be compacted by mechanical or hand tampers. Any modified asphalt that becomes loose, broken, contaminated, shows an excess or deficiency of the modified asphalt binder, or is in any way defective, shall be removed and replaced at no additional cost with fresh modified asphalt which shall be immediately compacted to conform with the surrounding area.

The actual rolling pattern is developed in a test strip prior to construction. The type of rollers to be used and their relative position in the compaction sequence shall generally be determined by the test strip, provided specification densities are attained. Coverages with a vibratory or steel wheel roller may precede pneumatic tired rolling.

Vibratory rollers shall not be operated in the vibratory mode when the internal temperature of the mix is less than 225° F. In no case shall a vibratory roller be operated in a vibratory mode when checking or cracking of the mat occurs at a greater temperature.

IX. Control

The quantity represented by each density lot will be no greater than a single day's production or approximately 400 tons, whichever is less.

Prior to the start of paving, a compaction test strip may be constructed, to determine the compactability of the mix design. Compactability shall be evaluated as the ability of the mix to attain a quality level of 97 percent of the maximum density determined by AASHTO T 209 without the need for excessive effort.

Following determination of compactability, the Contractor is responsible for subsequent control of the compaction effort.

X. Joints

The construction of dense graded modified asphalt requires the elimination of nearly all cold-joints. This is accomplished by keeping the paving panels short enough, that when the paver is set back to start another panel, the joint being placed against is still hot and not yet compacted. Once placement of the adjacent panel has started, the hot joint between the two panels can be compacted, resulting in a seamless connection.

When a prolonged break is anticipated, such as the end of a work shift, the cold joint panel will have a configuration as disclosed herein. The inside of the panel which is adjacent to the previously laid hot panel will be approximately, three (3) inches compacted; however the outer edge of this last (cold joint) panel will be approximately two (2) inches thick after compaction. Prior to placing the overlay panel a tack coat shall be applied at the rate of at least 0.1 gallons per square yard. The overlay panel will be laid a minimum of one (1) foot wider than the cold joint panel.

XI. Samples

Samples cut or cored from the completed project or as the modified asphalt is being placed may be taken. Additionally, samples of the uncompressed modified asphalt mixtures as well as all materials incorporated in the work may be taken. Where samples have been taken from the uncompressed modified asphalt, new material shall be placed and compacted to conform with the surrounding area.

XII. Surface Smoothness

The completed dense modified asphalt surface shall be of uniform texture, smooth, uniform as to crown and grade, and free from defects of all kinds.

XII. Weather Limitations

The modified asphalt shall not be placed on any wet surface, or when the average surface temperatures are less than those specified, or when weather conditions otherwise prevent the proper handling or finishing of the bituminous mixtures:

Surface Temperature Limitations for both Cap and Liner Courses: 35° F. min

XIV. Anti-Stripping Additive

An anti-stripping additive may be added to the modified asphalt binder if the mix design requires it to meet stripping limitations. If anti-strip is normally specified for local mixes made from the same aggregate, the modified asphalt may also include anti-strip or another substitute additive.

XV. Aggregates For the Modified Asphalt

A. Exemplary Aggregate Requirements

Aggregates used in the modified asphalt shall be manufactured from ledge rock, talus, or gavel. The material from which they are produced shall meet the following test requirements:

| | |
|---|---|
| ASTM C 131 LA Abrasion Loss | 30% max loss |
| ASTM C 127 SPG & Absorb Coarse Agg. | 2% max absorption |
| ASTM C 128 SPG & Absorb Fine Agg | 2% max absorption |
| ASTM D 2419 Sand Equivalent | 40 min |

Aggregates shall be uniform in quality, substantially free from wood, roots, bark, extraneous materials, and adherent coatings. The presence of a thin, firmly adhering film of weathered rock will not be considered as coating unless it exists on more than 50 percent of the surface area of any size between consecutive laboratory sieves.

Aggregate removed from deposits contaminated with various types of wood waste shall be washed, processed, selected, or otherwise treated to remove sufficient wood waste, so that the oven-dried material retained on a ¼-inch square sieve shall not contain more than 0.1 percent by weight of material with a specific gravity less than 1.

B. Exemplary Test Requirements

Aggregate for the modified asphalt shall meet the following test requirements:

The fracture requirements are at least one fractured face on 75 percent of the material retained on each specification sieve size U.S. No. 10 and above, if that sieve retains more than 5 percent of the total sample.

When material is being produced and stockpiled for use on a specific contract the fracture and sand equivalent requirements shall apply at the time of stockpiling. When material is used from a stockpile that has not been tested as provided above, the requirements for fracture and sand equivalents shall apply at the time of its introduction to the cold feed of the mixing plant.

The properties of the aggregate in a preliminary mix design for the modified asphalt shall be such that, when it is combined within the limits set forth in Section 3-01.1(6) and mixed in the laboratory with the modified asphalt binder, mixtures with the following test values can be produced:

| | |
|---|---|
| Permeability Coefficient, k (ASTM D 5084) | $<1 \times 10^{-8}$ cm/sec* |
| Air Voids % (ASTM D 2041 ASTM D 3203) | <3% max* |
| Modified Lottman Stripping Test, TSR (ASTM 4867/4867M) | >80% |

*Modified Asphalt dense graded only

C. Gradation

The Contractor may furnish aggregates for use on the same contract from a single stockpile or from multiple stockpiles. The gradation of the aggregates shall be such that the completed mixture complies in all respects with the pertinent requirements of Section 3-01.1(6). Acceptance of the aggregate gradation shall be based on samples taken from the final mix.

D. Blending Sand

In the production of aggregate for the modified asphalt, there is often a deficiency of material passing the U.S. No. 40. When this occurs, blending sand in an amount as specified may be used to make up this deficiency, provided that a satisfactory final mix is produced, including fracture requirements.

Blending sand shall be clean, hard, sound material, either naturally occurring sand or crusher fines, and must be material which will readily accept a modified asphalt binder coating. The exact grading requirements for the blending sand shall be such that, when it is mixed with an aggregate, the combined product shall meet the mix design requirements. Blending sand shall meet the following quality requirement:

Sand Equivalent 40 min.

The materials laboratory shall test blending sand before it will be approved for use.

E. Mineral Filler

Mineral filler, when used in the modified asphalt mix, shall conform to the requirements of MSHTO M 17.

F. Proportions of Materials

The materials of which the modified asphalt is composed shall be of such sizes, gradings, and quantities that, when proportioned and mixed together, they will produce a well-graded dense impermeable mixture or an open graded very permeable drainage layer within the requirements listed in FIG. 7. All sieve testing shall be in accordance with ASTM C 136 Sieve Analysis of Fine and Course Aggregates. See FIG. 7 for an exemplary aggregate gradation for dense and open graded modified asphalt mixture.

G. Basis of Acceptance

1. The modified asphalt mixture will be accepted based on its conformance to the project job mix formula (JMF). For the determination of a project JMF, the Contractor shall submit representative samples of the various aggregate and blend sand, to be used along with the gradation data showing the various aggregate stockpile averages and the proposed combining ratios and the average gradation of the completed mix. Based on this submittal from the Contractor, the Contractor will determine the modified asphalt binder content, anti-strip requirement, and the modified asphalt binder retention factor in the mix design process. Using the representative samples submitted and proposed proportion of each, trial mix tests will be run to determine the percentage of the modified asphalt binder, by weight, to be added.

The intermingling of the modified asphalt mixtures produced from more than one JMF is prohibited. Each paver path of the modified asphalt mixture placed during a working shift shall conform to a single job mix formula established for the class of the modified asphalt mixture specified unless there is a need to make an adjustment in the JMF.

No mixture shall be produced for use on the project until the amount of the modified asphalt binder and anti-strip additive to be added has been established.

2. Job Mix Formula Tolerances and Adjustments
    a. Tolerances. After the JMF is determined, the several constituents of the mixture at the time of acceptance shall conform to the following tolerances:

| Constituent of Mixture | Tolerance Limits[1] |
|---|---|
| Aggregate passing ¾", ⅝", ½", and ⅜" sieves | Broad band specification |
| Aggregate passing No. 4 sieve | ±6% |
| Aggregate passing No. 8 sieve | ±5% |
| Aggregate passing No. 16 sieve | ±4% |
| Aggregate passing No. 30 sieve | ±4% |
| Aggregate passing No. 50 sieve | ±3% |
| Aggregate passing No. (100) sieve | ±3% |
| Aggregate passing No. (200) sieve | ±2% |
| Modified Asphalt Binder | ±0.4% |

[1]The tolerance limit for each mix constituent shall not exceed the broad band specification limits 3. Aggregates Adjustments. Upon written request from the Contractor, field adjustments to the JMF may be approved, including the Contractor's proposed combining ratios for mineral aggregate stockpiles and blend sand. The maximum allowed gradation change shall be 2 percent for the aggregate retained on the No. 8 sieve and above, 1 percent for the aggregate passing the No. 16, No. 30 and No. 50 sieves, and 0.5 percent for the aggregate passing the No. 100 and No. 200 sieve. These field adjustments to the JMF may be made, provided the change will produce material of equal or better quality. The above adjustments and/or any further adjustments as ordered will be considered as a new JMF. Adjustments beyond these limits will require development of a new JMF. The adjusted JMF plus or minus the allowed tolerances shall be within the range of the broad band specifications.

H. Gradation

The Contractor may furnish aggregates for use on the same contract from a single stockpile or from multiple stockpiles. The gradation of the aggregates shall be such that the completed mixture complies in all respects with the pertinent requirements.

XVI. Stockpiling Aggregates

A. Description

This work shall consist of placing the specified aggregates in the stockpiles at the sites and in the amounts as shown in the Plans. This section also includes the requirements pertaining to the removal of aggregates from stockpiles.

B. Construction of Stockpiles

Stockpiles in excess of 200 cubic yards shall be built up in layers not more than 4 feet in depth. Stockpile layers shall be constructed by trucks, clamshells, or other methods. Pushing aggregates into piles with a bulldozer will not be permitted. Each layer shall be completed over the entire area of the pile before depositing aggregates in the succeeding layer. The aggregate shall not be dumped so that any part of it runs down and over the lower layers in the stockpile. The method of dropping from a bucket or spout in one location to form a cone shaped pile will not be permitted. Any method of placing aggregates in stockpiles, which breaks, degrades, or otherwise damages the aggregate, will not be permitted. Stockpiles of less than 200 cubic yards shall be piled in a manner to prevent segregation of the various sizes of material.

No equipment other than pneumatic tired equipment shall be used in constructing the stockpiles of processed or manufactured aggregates.

Stockpiles of different types or sizes of aggregate shall be spaced far enough apart, or separated by suitable walls or partitions, to prevent the mixing of the aggregates. Aggregate shall not be deposited where traffic, vehicles, or Contractor's equipment will either run over or through the piles, or in any way cause foreign matter to become mixed with the aggregates.

C. Removing Aggregates from Stockpiles

Aggregates shall be removed from stockpiles in a manner to avoid separation of sizes or admixture of dirt or foreign material.

No equipment other than pneumatic tired equipment shall be used on stockpiles of processed or manufactured aggregates in removing the materials from the stockpiles. When removing materials from the face of the stockpile, the equipment shall be operated in a manner to face-load from the floor to the top of the stockpile to obtain maximum uniformity of material.

XVII. Anti-Stripping Additive

Heat-stable liquid anti-stripping additive may be added to the asphalt mix. At the option of the Contractor, the anti-stripping additive can be either added to the liquid asphalt or sprayed on the aggregate on the cold feed. Once the process and type of anti-stripping additive proposed by the Contractor have been approved by the Materials Laboratory, the process, brand, grade, and amount of anti-stripping additive shall not be changed without prior approval.

When liquid anti-stripping additive is added to the liquid asphalt, the amount will be designated, but shall not exceed 1 percent by weight of the liquid asphalt.

When polymer additives are sprayed on the aggregate, the amount will be designated, but shall not exceed 0.67 percent by weight of the aggregate.

The use of another process or procedure for adding anti-stripping additive to the asphalt mix will be considered based on a proposal from the Contractor.

XVIII. Weighing Equipment

A. General Requirements for Weighing Equipment

The Contractor shall provide, set up, and maintain the scales or use permanently installed, certified, commercial scales.

Scales shall:

1. Be accurate to within one-half of 1 percent throughout the range of use;
2. Not include spring balances;
3. Include beams, dials, or other reliable readout equipment;
4. Be arranged so that operators and inspectors can safely and easily see the dials, beams, rods, and operating scale mechanisms;
5. Be built to prevent scale parts from binding, vibrating, or being displaced and to protect all working parts from falling material, wind, and weather; and
6. Be carefully maintained, with (a) bunkers and platforms kept clear of accumulated materials that could cause errors and (b) knife edges given extra care and protection.
7. Be calibrated in accordance with standard specifications for the state where work is performed and per manufacturers' specifications.

At each batching and platform scale location, the Contractor shall have available not less than 10 standard 50-pound weights for scale calibration and testing.

B. Specific Requirements for Batching Scales

Qualified operators employed by the Contractor shall weigh all materials proportioned by weight on an accurate, approved scale Each scale shall be designed to support a weighing hopper. The arrangement shall make it convenient for the operator to remove material from the hopper while watching readout devices. Any hopper mounted on a platform scale shall have its center of gravity directly over the platform centerline.

Marked intervals on the readout device shall be spaced evenly throughout and shall be based on the scale's nominal rated capacity. These intervals shall be at least 1 pound, but shall not exceed one-tenth of 1 percent of nominal rated capacity.

An agent of the scale manufacturer shall test and service any batch scale before its use at each new site and then at 6-month intervals. The Contractor shall provide a copy of the final results after each test. Whenever the requested, the Contractor's operator(s) shall test the scale while the inspector observes.

The modified asphalt binder shall be weighed on a scale not used for other materials.

C. Specific Requirements for Platform Scales

The Contractor shall provide the platform scales and any tickets required for self-printing scales. Each weigh or load ticket shall contain gross, net, and tare weight. It shall also identify the weighed material. A tare weight shall be taken of each hauling vehicle at least twice a day.

If commercial scales are used, the Contractor shall:
1. Provide the scale operator with approved load tickets:
2. Provide duplicate, legible copies to the Material Receiver at the delivery point; and
3. Guarantee permission for an agent to observe the weighing and to check and compile the daily scale weight record.

Each commercial weigher shall test the scales at least daily. Test methods and procedures for recording test results and tare weight shall be approved in advance. Before use at a new site and then at 6-month intervals, the scale shall be serviced and tested with at least 10,000 pounds by an agent of its manufacturer. In any case, the Contractor shall provide a copy of the final test results. Scales to be certified in accordance with accepted calibration methods.

1. Exemplary Embodiment

The following example is provided merely for purposes of illustration and should in not limit the disclosure contained herein.

An example project was designed and constructed according to the procedures outlined herein as follows:

a. The site was prepared by others by placing a soil cover and 22 in. of gravel over the top of a 20-year-old landfill. The site was to be used to park 85 to 100 garbage-hauling trucks overnight, between daily trips.
b. The site was accepted by the contractor who was to place the modified asphalt cap, based upon it being compacted to a smooth, firm state and tested using proof rolling with a loaded dump truck. No soft areas were detected, and the site was then ready for placement of the cap.
c. A supplier of asphalt binder was engaged to mix the modified binder; a sample of base asphalt was obtained and sent to the contractor's designated laboratory, where it was blended with a variety of modifiers and the optimal combination was selected based upon the test data such as shown in FIG. 5. The formula selected is partially based upon the climate for the site, and is adjusted accordingly. In this example, for a site near Chicago, a key concern was to improve resistance to thermal cracking in cold winter weather. For a warmer climate, such as South Texas, the primary criterion might be resisting rutting under traffic in hot weather when the binder softens.
d. The laboratory then prepared a Job Mix Formula (JMF) to be used in the modified asphalt cap. A series of specimens were fabricated using varying quantities of the modified binder and a high quality limestone graded to the specification guidelines provided herein. The optimum binder content was found to be 7.0% based upon total weight of the mixture. This optimum binder content was determined based upon the best compromise among several physical properties, including the following: maximum density and minimum air voids, ease of compaction as determined by varying the compaction energy, the minimum coefficient of permeability, adequate resistance to water (stripping), and the resilient modulus.
e. Construction of the modified asphalt cap was completed over two days of work, and was immediately made available to the owner for use by the garbage trucks. The hot mix plant manufactured the modified asphalt mixture according to the JMF and it was hauled to the construction site with covered and insulated dump trucks. Typically, each load of hot mix is tested for temperature (as specified in the JMF) prior to acceptance at the jobsite. Good construction practices of laydown using conventional paving equipment and compactors were followed, and the required density (<3.0% voids) was achieved and confirmed using a nuclear density device that is typically used for this purpose. Because of the critical low permeability requirement, the nuclear density testing was performed far more frequently than would be for highway pavements, to assure a uniform result. The hot-lapping technique for obtaining dense hot joints was successful, but the cold joints created when the paving operation was interrupted at the end of the day was not quite as good. Based upon these results, the cold joint design was modified to include a 10-ft. wide tapered joint as described herein. This design was used in a later extension of the cap on this project and proved to be successful with full density achieved at the joint similar to the main area of the cap. Thickness of the cap was maintained at the nominal 4-in.±½ in. required.

f. The cap was core-sampled and the cores tested in the laboratory for permeability, the primary acceptance criterion. The coefficient of permeability was found to be $<1\times10^{-7}$ cm/sec, which was the required limit.

g. Because of the expected very heavy truckloads and large number of repetitions over time, it became desirable to evaluate the expected performance of the cap over time. Two years following construction, the entire site was tested using a Falling Weight Deflectometer (FWD), that simulates heavy loads and measures the response of the entire cap (pavement) to load, and identifies variabilities, including soft areas that would be suspect for premature failure. (Note that other projects are often tested prior to placing the modified asphalt cap, using the FWD to locate soft areas that can then be dug out and replaced with better quality material.) Simultaneously, additional core samples were obtained from the cap as well as an adjacent pavement (main driveway into the facility) made of conventional asphalt mixture and were further tested in the laboratory using specialized techniques to measure fatigue life, rutting resistance, cracking resistance, weathering, and water sensitivity. These test results were utilized in a computer model that was developed to predict the service life of a pavement (i.e., modified asphalt cap being used as a pavement) and was based upon more than 2000 previously constructed highway pavements ranging up to 20 years old.

h. The results of the laboratory tests and computer model predictions for both the modified asphalt cap and the conventional pavement were compared, with the following results:

The fatigue life (alligator cracking) was increased from about 10 to >50 years before any maintenance would be required.

The expected life to reach unacceptable rutting was about three times over that for conventional pavement.

The expected life for resistance to thermal cracking was increased and defined as 0.5% chance in 10 years, and would result in only a few linear feet of cracks in the worst case.

Both aging and water resistance were determined to not become a factor in the life of the pavement, largely based upon the inability of water and air to enter the low air void mixture.

Additionally, an area of soft subgrade was found using the FWD that had gone undetected prior to construction. This area, consisting of <2% of the total, reduced the expected life to about 5 to 10 years in that area before it may need to be replaced or repaired.

i. After the first winter (cold weather), several cracks appeared that were tested and found to be at the cold joints that were constructed using the old technique and has since been improved, as noted herein. These cracks were sealed by routing and filling with hot modified asphalt mastic, using conventional crack sealing equipment. It was also noted that the adjacent driveway pavement constructed of conventional asphalt mixture was extensively cracked (typical alligator fatigue cracking), while the pavement of the modified asphalt cap was not cracked, even though it had received the same traffic.

XIX. Conclusion

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A joint for an asphalt paving mat having permeability less than $1\times10^{-5}$ cm/sec comprising:

a first panel having a first edge and a second edge, the first edge having a first thickness and the second edge having a thickness less than the first thickness such that the panel has a tapered cross sectional thickness;

modified asphalt on a top surface of the first panel;

a second panel overlaying the first panel, the second panel having a reciprocal tapered cross sectional thickness wherein the combination of the first and the second panels provides a constant thickness; and a membrane anchored between the first and the second panels wherein the membrane further includes at least one of a window, the window providing an area of bonding contact between the first panel and the second panel.

* * * * *